US009208374B2

(12) United States Patent
Ito et al.

(10) Patent No.: US 9,208,374 B2
(45) Date of Patent: Dec. 8, 2015

(54) INFORMATION PROCESSING APPARATUS, CONTROL METHOD THEREFOR, AND ELECTRONIC DEVICE

(71) Applicant: CANON KABUSHIKI KAISHA, Tokyo (JP)

(72) Inventors: Yoshinori Ito, Tokyo (JP); Hideo Noro, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/084,211

(22) Filed: Nov. 19, 2013

(65) Prior Publication Data
US 2014/0147034 A1 May 29, 2014

(30) Foreign Application Priority Data

Nov. 27, 2012 (JP) .................................. 2012-259059

(51) Int. Cl.
G06K 9/62 (2006.01)
G06K 9/00 (2006.01)
G06T 1/60 (2006.01)
H04N 5/225 (2006.01)

(52) U.S. Cl.
CPC ........ *G06K 9/00288* (2013.01); *G06K 9/00973* (2013.01); *G06K 9/6256* (2013.01); *G06T 1/60* (2013.01)

(58) Field of Classification Search
CPC .................................. G06K 9/00; G06T 1/00
USPC ........................... 382/155, 103; 348/169–172
See application file for complete search history.

(56) References Cited

U.S. PATENT DOCUMENTS

| 7,489,803 | B2 * | 2/2009 | Haynes et al. | 382/103 |
| 8,482,812 | B2 * | 7/2013 | Yashiro | 358/464 |
| 8,913,782 | B2 * | 12/2014 | Yashiro et al. | 382/103 |
| 2010/0103476 | A1 | 4/2010 | Yashiro | |

(Continued)

FOREIGN PATENT DOCUMENTS

| JP | 2005-190477 A | 7/2005 |
| JP | 2010-102584 A | 5/2010 |

(Continued)

OTHER PUBLICATIONS

P. Viola et al., "Rapid Object Detection using a Boosted Cascade of Simple Features", IEEE Conference on Computer Vision and Pattern Recognition (2001).

(Continued)

*Primary Examiner* — Abolfazl Tabatabai
(74) *Attorney, Agent, or Firm* — Fitzpatrick, Cella, Harper & Scinto

(57) ABSTRACT

A technique of high-speed information processing is realized by determining a method of accessing processing target data so as to allow high-speed access in consideration of a memory architecture. According to the technique, in a method of performing information processing by sequentially referring to element data of the processing target data stored in a main memory according to a predetermined information processing rule such as a recognition dictionary, when generating the information processing rule, a reference order of the element data which improves a cache hit rate is determined based on a rule for storing the element data of the processing target data in the main memory, records of the positions of referred element data, and the cache architecture.

15 Claims, 19 Drawing Sheets

(56) References Cited

U.S. PATENT DOCUMENTS

| | | |
|---|---|---|
| 2011/0010317 A1 | 1/2011 | Ito et al. |
| 2012/0057746 A1* | 3/2012 | Sakai et al. .................. 382/103 |

FOREIGN PATENT DOCUMENTS

| | | |
|---|---|---|
| JP | 2010-165046 A | 7/2010 |
| JP | 4553044 B | 9/2010 |

OTHER PUBLICATIONS

V. Lepetit et al., "Keypoint recognition using randomized trees", IEEE Transactions on Pattern Analysis and Machine Intelligence, 28(9):1465-1479 (Sep. 2006).

M. Ozuysal et al., "Keypoint recognition using Random Ferns", IEEE Transactions on Pattern Analysis and Machine Intelligence, 32(3):448-461 (Mar. 2010).

* cited by examiner

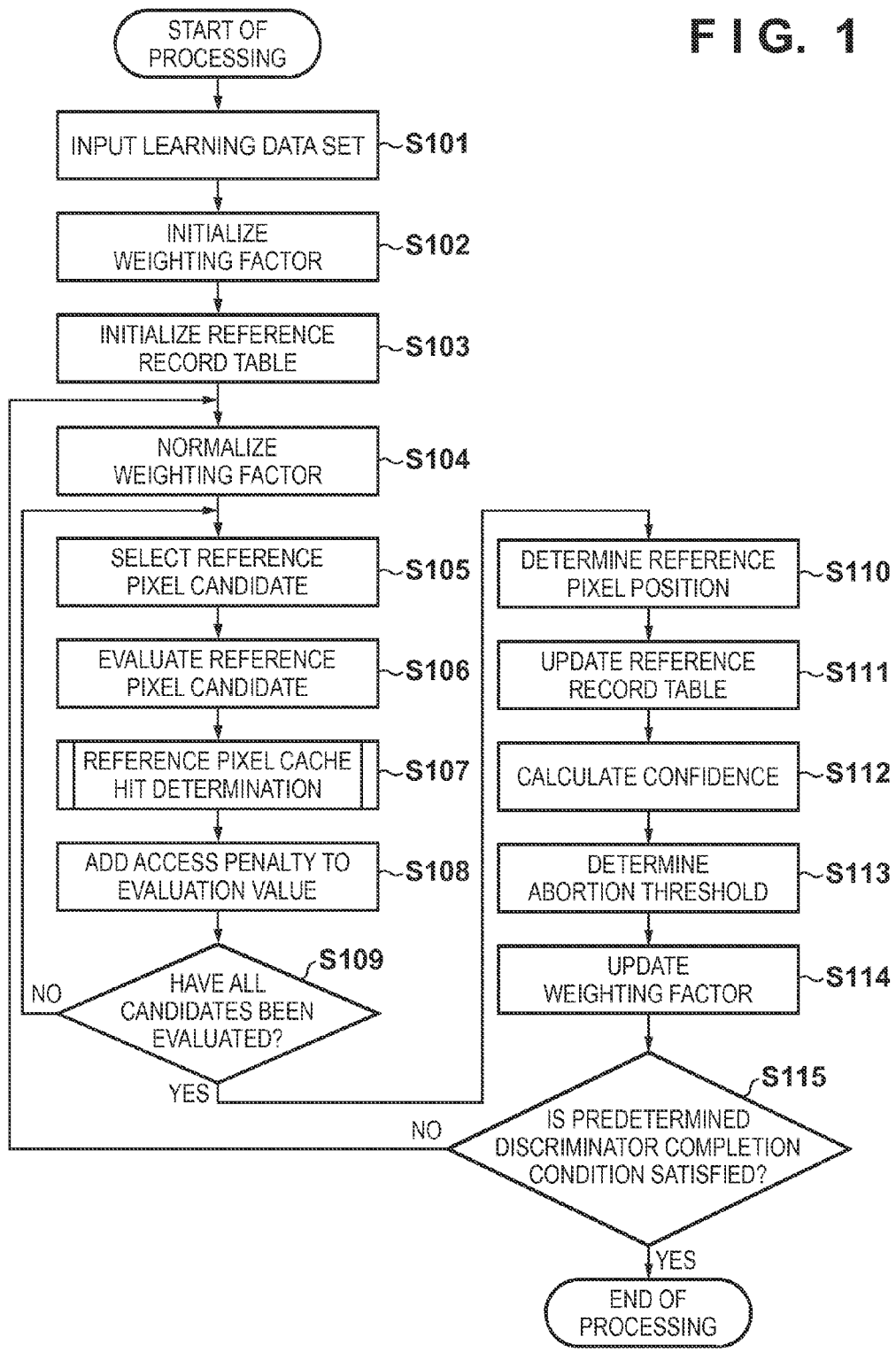

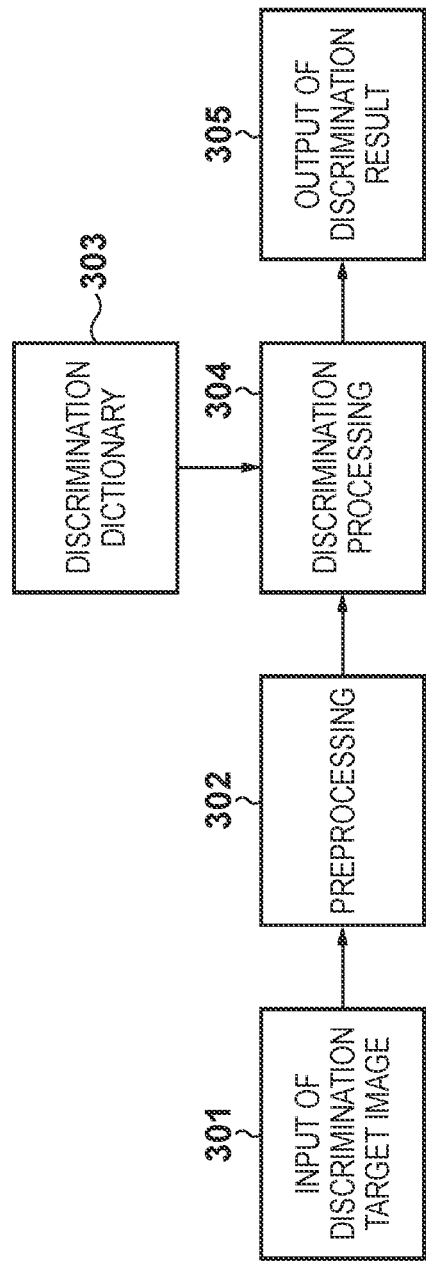

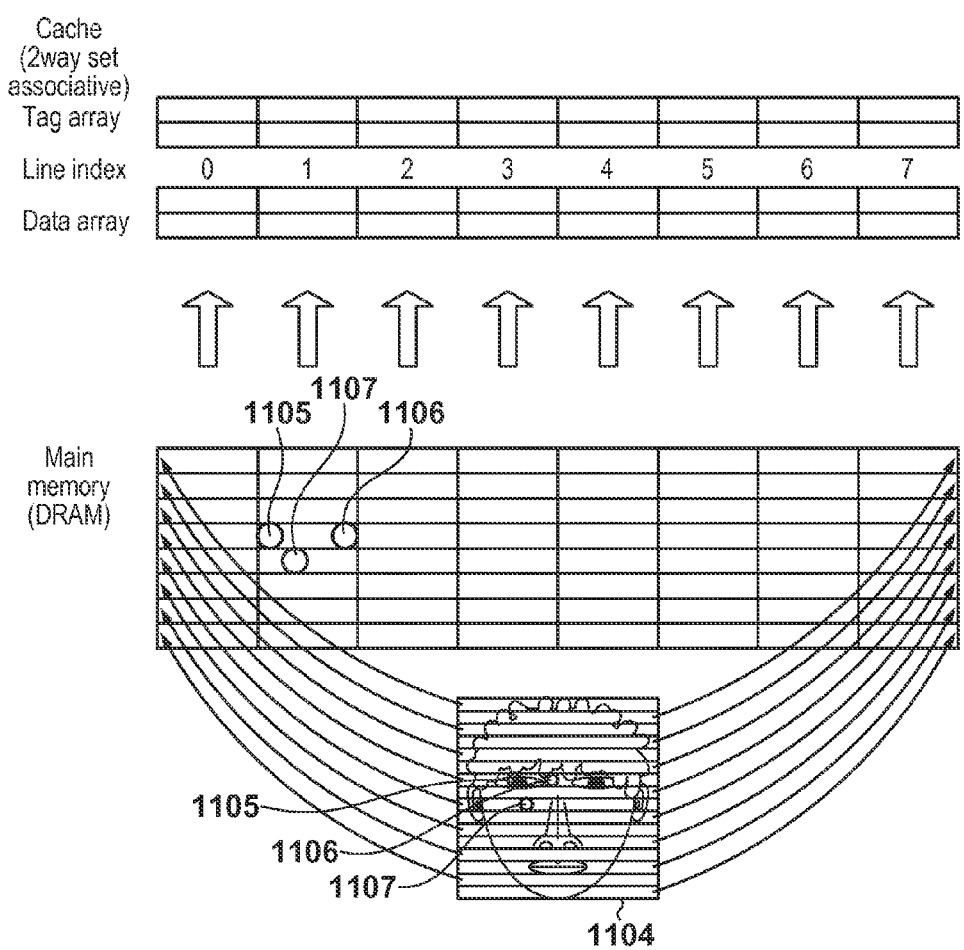

F I G. 13A
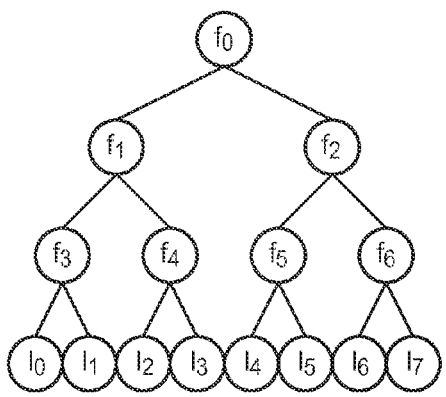
F I G. 13B
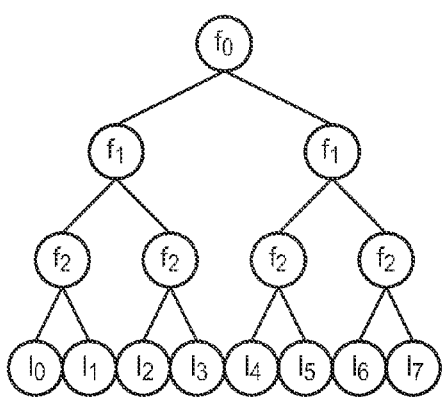
F I G. 13C
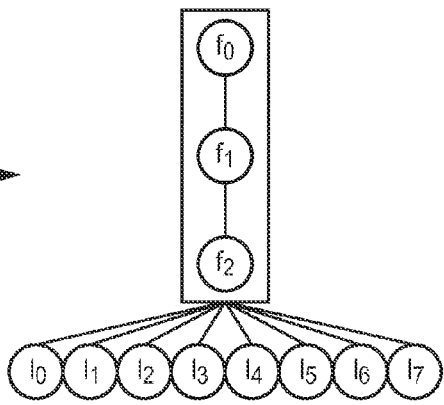

FIG. 16A

| idx | m | s | x0 | y0 | x1 | y1 |
|---|---|---|---|---|---|---|
| 0 | 0 | 0 | 6 | 2 | 8 | 13 |
| 1 | 0 | 1 | 11 | 4 | 3 | 7 |
| 2 | 0 | 2 | 7 | 12 | 15 | 5 |
| ... | | | | | | |
| S-1 | 0 | S-1 | 9 | 14 | 10 | 9 |
| S | 1 | 0 | | | | |
| ... | | | | | | |
| MxS-1 | M-1 | S-1 | | | | |

FIG. 16B

| m | s | x0 | y0 | x1 | y1 |
|---|---|---|---|---|---|
| 0 | 0 | 6 | 2 | 8 | 13 |
| 0 | 7 | 4 | 2 | 14 | 6 |
| 1 | 4 | 10 | 3 | 3 | 7 |
| 0 | 9 | 1 | 7 | 12 | 6 |
| 1 | S-4 | | | | |
| 2 | 1 | | | | |
| 0 | S-7 | | | | |
| ... | | | | | | |

FIG. 16C

| idx | ONE POINT HIT | ACCESS TIME 0 | ACCESS TIME 1 |
|---|---|---|---|
| 1 | | | |
| 2 | | | |
| 3 | | | |
| 4 | | | |
| 5 | | | |
| 6 | | | |
| ... | | | |
| MxS-1 | | | |

INFORMATION PROCESSING APPARATUS, CONTROL METHOD THEREFOR, AND ELECTRONIC DEVICE

BACKGROUND OF THE INVENTION

1. Field of the Invention

The present invention relates to an information processing apparatus for performing calculation processing for data such as an image stored in a memory at high speed, a control method for the information processing apparatus and an electronic device.

2. Description of the Related Art

Conventionally, there are known an information processing method and information processing apparatus which perform, for an array of a number of element data items such as images stored in a memory, calculation processing by sequentially referring to element data at specific positions according to a predetermined rule, and obtain a calculation result.

A method which uses a Boosting type discriminator for detecting a target object such as a human face in image data at high speed is proposed in, for example, "Rapid Object Detection using a Boosted Cascade of Simple Features", P. Viola and M. Jones, IEEE Conference on Computer Vision and Pattern Recognition 2001 (to be referred to as reference 1 hereinafter). This method accumulates scores obtained by sequentially referring to and calculating feature amounts at predetermined positions within a sliding window based on the dictionary of cascaded weak discriminators, which has been obtained in advance by machine learning, and then determines whether to abort calculation or the object is a final target object.

A Haar-like feature calculated as the linear sum of total values within a plurality of local rectangles is used as a feature amount referred to by each weak discriminator. It is possible to calculate, with a low load, a total value within a rectangle by performing addition/subtraction processing by referring to only four points in an integral image or an image called a summed area table, which has been generated in advance from an original brightness image.

As a feature amount to be referred to by each weak discriminator, a feature amount which maximizes the discrimination performance when the weak discriminator is executed is selected by pre-learning using a number of sample data items. Furthermore, if an accumulated score obtained by adding a score so far to a score calculated by the weak discriminator has not reached a predetermined threshold, subsequent calculation is aborted to reduce the overall calculation amount, thereby increasing the speed.

Japanese Patent No. 4553044 (to be referred to as reference 2 hereinafter) realizes high-speed recognition processing by a number of weak discriminators similar to those described in reference 1 by using, as a feature amount, the difference in brightness between two points determined by pre-learning for each weak discriminator in a discrimination target brightness image.

There is also proposed a method for realizing multi-class discrimination at high speed with high accuracy by creating a multi-class discriminator by combining a number of nodes each of which performs binary discrimination by simple calculation. For example, a method called randomized trees described in "Keypoint recognition using randomized trees", V. Lepetit and P. Fua, IEEE Transaction on Pattern Analysis and Machine Intelligence, 28(9): 1465-1479, September 2006 (to be referred to as reference 3 hereinafter) uses a discriminator obtained by combining a number of nodes in a binary tree pattern, thereby omitting unnecessary discrimination. Furthermore, a method called random ferns described in "Keypoint recognition using Random Ferns", M. Ozuysal, M. Calonder, V. Lepetit, and P. Fua, IEEE Transaction on Pattern Analysis and Machine Intelligence, 32(3): 448-461, March 2010 (to be referred to as reference 4 hereinafter) uses a discriminator which uses a single binary feature within a single hierarchical layer, thereby proposing a higher-speed multi-class discriminator.

As described above, in many conventional information processing methods of performing discrimination processing for, for example, an image, attention is paid to only reduction in calculation amount of a discriminator to increase the speed.

On the other hand, there are various kinds of memory architectures for the circuit of a processing system such as a computer for executing such information processing. For example, in general, an architecture including a DRAM which has a large capacity but takes long time to access from a processor and an SRAM which is arranged near the processor and can be accessed at high speed but has a small capacity has been often used.

Some of such architectures increase the speed by transferring a continuous area with a predetermined size at once from the DRAM to the SRAM, which is called burst transfer.

Alternatively, a cache mechanism in which a predetermined range is copied to the SRAM when accessing data in the DRAM and then only the SRAM is accessed when referring to data within that range has been often used. Various schemes such as a direct mapping scheme and set associative cache are proposed as cache mechanisms.

To perform calculation processing for data at high speed, it is effective to reduce, as much as possible, not only a calculation amount but also a load (to be referred to as a reference load hereinafter) generated in data access, in addition to consideration of a memory architecture as described above.

In Japanese Patent Laid-Open No. 2010-102584 (to be referred to as reference 5 hereinafter), discriminators are divided into a first half group and a second half group, and a local feature referred to by a discriminator in the first half group is limited to a long linear shape in the main scanning direction. Alternatively, a local feature is selected by limiting to pixels within a range obtained by thinning out pixels every other line. This facilitates burst transfer from the DRAM to the SRAM, thereby attaining high speed.

Japanese Patent Laid-Open No. 2005-190477 (to be referred to as reference 6 hereinafter) describes processing of performing discrimination processing for each block of an image by referring to a histogram corresponding to a discrimination processing dictionary. Changing the order of bins of a histogram from the normal order improves a cache hit rate when referring to the histogram.

The techniques disclosed in references 1 to 4 do not consider the memory architecture of a processing system for executing information processing. The technique disclosed in reference 5 mainly pays attention to burst transfer, and does not directly consider a cache architecture. The technique disclosed in reference 6 improves the cache hit rate when referring to a histogram generated in advance, that is, discrimination processing dictionary data for object detection processing but does not consider reference to processing target image data.

SUMMARY OF THE INVENTION

The present invention has been made in consideration of the above problems, and provides a technique of obtaining information to improve the efficiency of processing of sequentially referring to a number of elements such as pixels forming image data in consideration of the hardware configuration of a target system for implementing the processing.

This specification in its first aspect provides an information processing apparatus which generates an information processing rule for executing information processing for target data in a target system including a processor and a memory, comprising: an input unit configured to input configuration information concerning configuration elements of the target system; a calculator configured to calculate, in accordance with the input configuration information, a reference load for referring to an element at each position in the target data in the memory when the processor executes the information processing; and a determination unit configured to determine the information processing rule representing the positions of the elements to be referred to and a reference order thereof using the reference load calculated by the calculator.

This specification in its second aspect provides an electronic device, executing information processing for target data by using an information processing rule generated by the above described information processing apparatus, and referring to the generated information processing rule.

This specification in its third aspect provides a control method for an information processing apparatus which generates an information processing rule for executing information processing for target data in a target system including a processor and a memory, the method comprising: an input step of inputting configuration information concerning configuration elements of the target system; a calculation step of calculating, in accordance with the input configuration information, a reference load for referring to an element at each position in the target data in the memory when the processor executes the information processing; and a determination step of determining the information processing rule representing the positions of the elements to be referred to and a reference order thereof using the reference load calculated in the calculation step.

According to the present invention, it is possible to realize high-speed information processing since a method of accessing target data to be processed is determined so as to allow high-speed access in consideration of the memory architecture of a target system for executing information processing.

Further features of the present invention will become apparent from the following description of exemplary embodiments (with reference to the attached drawings).

BRIEF DESCRIPTION OF THE DRAWINGS

FIG. 1 is a flowchart illustrating learning processing of a dictionary for image discrimination processing according to an embodiment;

FIG. 3 is a block diagram for explaining the procedure of image discrimination processing according to the embodiment;

FIG. 11 is a view for explaining application to a cache architecture using a set associative scheme according to an embodiment;

FIGS. 13A to 13C are views for explaining a tree type discriminator and fern type discriminator according to an embodiment;

FIGS. 16A to 16C are views for explaining an example of the processing of rearranging binary features according to the embodiment, which is applied to the fern type discriminator;

DESCRIPTION OF THE EMBODIMENTS

Figure 19:
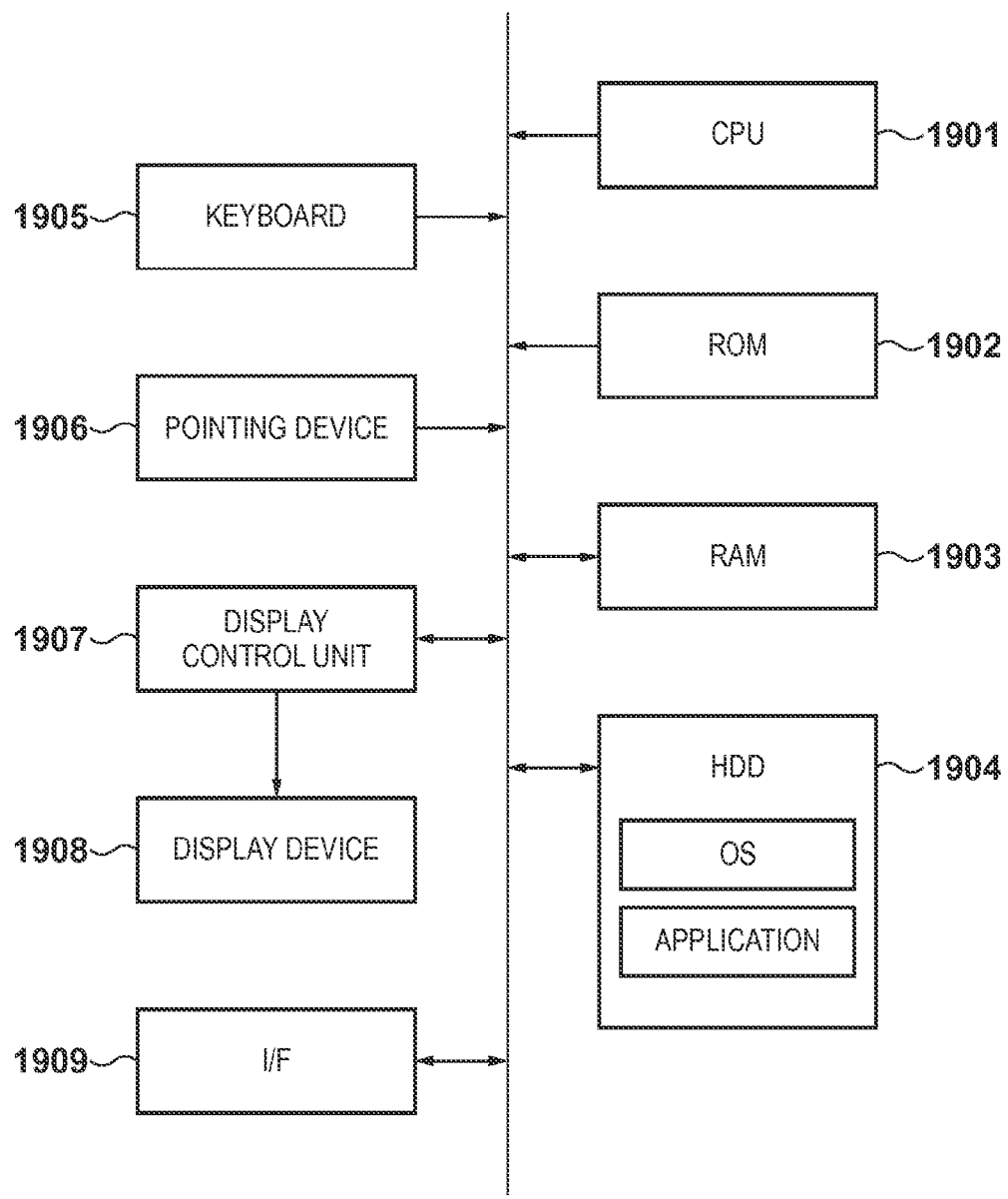
FIG. 19 is a block diagram showing the configuration of an information processing apparatus to which an embodiment is applied.

FIG. 19 is a block diagram showing the configuration of an information processing apparatus according to an embodiment. As shown in FIG. 19, the apparatus includes a CPU 1901 for controlling the overall apparatus, a ROM 1902 storing a BIOS and boot program, and a RAM 1903 used to load an OS or application and used as a work area by the CPU 1901. The apparatus also includes a hard disk (HDD) 1904 serving as a large-capacity storage device, a keyboard 1905, a pointing device 1906 such as a mouse, a display control unit 1907 which has a video memory and controls display processing, a display device 1908 formed by, for example, a liquid crystal display, and an interface (I/F) 1909 for communication with an external device. In the aforementioned configuration, when the apparatus is powered on, the CPU 1901 executes the boot program in the ROM 1902, and loads the operating system (OS) stored in the HDD 1904 into the RAM 1903. After that, the CPU 1901 loads, into the RAM 1903, an application program according to the embodiment, which is stored in the HDD 1904 under the OS, and executes it. The apparatus thus functions as a processing rule information generation apparatus in a product to be developed.

In the embodiment, assume that an electronic device to be developed is a digital camera (image capturing apparatus) for the sake of descriptive convenience. Many recent digital cameras implement class discrimination processing such as recognition of a human face as an object. In the embodiment, a case in which information indicating the reference order of pixels to improve the efficiency (increase the speed) of optimization of class discrimination processing is determined in consideration of information concerning the hardware configuration of a digital camera to be developed will be described. It is necessary to first input information (to be referred to as hardware configuration information hereinafter) concerning hardware of the digital camera to be developed, which includes a processor. Assume that the information is input via the interface 1909. In this case, the input source via the interface 1909 may be any kind of storage medium such as a network storage or USB memory. In the input hardware configuration information, the number of processor cores, the size and scheme of a cache memory, the capacity of a main memory (a DRAM in many cases), and the bus width (the number of bits) of a data bus are described. Embodiments of the present invention will be described below.

[First Embodiment]

<Image Discrimination Processing Basic System Configuration>

Figure 2A:
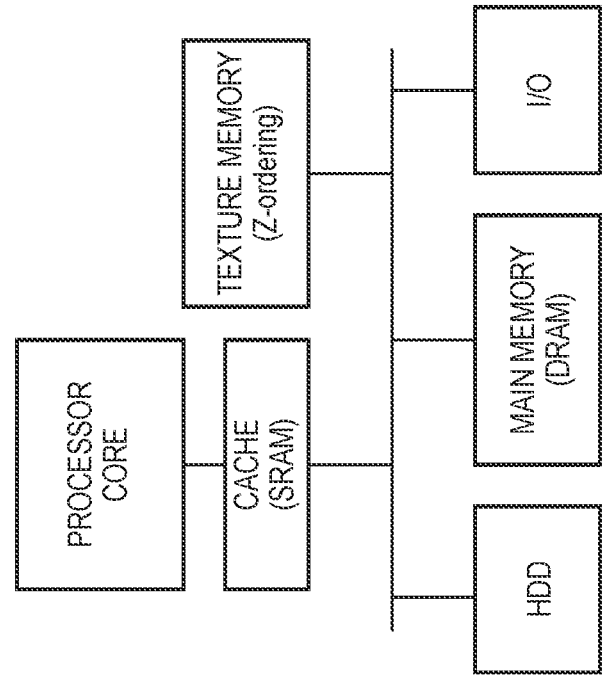
FIGS. 2A and 2B are block diagrams each showing an example of the configuration of a target system for executing discrimination processing using a discrimination processing dictionary according to the embodiment.

FIG. 2A shows the configuration around a processor, which is represented by hardware configuration information, in a digital camera to be developed. With this configuration, a case in which information (information processing rule) for defining an efficient reference order of element data (pixels) when executing class discrimination processing of discriminating whether an image belongs to a specific class is generated will be described.

Note that in this specification, a processing system (a digital camera in this embodiment) shown in FIG. 2A for executing information processing like class discrimination processing will be referred to as a target system hereinafter. When the target system executes information processing, it uses an information processing rule generated in advance by a technique such as a machine learning technique. A processing system for executing processing of generating the information processing rule may be different from the target system.

FIG. 3 is a block diagram for explaining the rough procedure of image class discrimination processing which is information processing executed by the target system according to the embodiment.

In the target system shown in FIG. 2A, reference numeral 201 denotes a system bus which interconnects the configuration elements of the system and allows exchange of data and signals; and 202, a processor core such as a CPU which performs various calculation operations and data processes. Note that the system will be explained as a single-processor configuration including only one processor core. The present invention, however, is not limited to this. A main memory 204 stores data to undergo calculation processing by the processor core 202, and processing programs to be executed. The main memory 204 is generally formed by a DRAM, which has a relatively large storage capacity but is a low speed. The processor core 202 increases the speed by accessing the main memory 204 and the like via a cache architecture 203. A cache is generally formed by an SRAM whose speed is generally several tens of times higher than that of the DRAM but which has a relatively small storage capacity. The cache architecture according to this embodiment will be described later. Reference numeral 205 denotes an input/output interface which controls input/output to/from the user or the outside of the system; and 206, a large-capacity nonvolatile storage device such as a hard disk device which permanently stores programs to be executed by the system, parameters, and the like. Note that a program to be executed by the system is transferred from the hard disk device 206 to the main memory 204 upon power-on of the system, and the processor core 202 sequentially reads and executes program instructions on the main memory 204.

To execute the image class discrimination processing according to the embodiment, a discrimination target image is input or received, as denoted by reference numeral 301 in FIG. 3. In this embodiment, for the sake of descriptive convenience, an input processing target image (processing target data) has a fixed pixel size of 16×16 pixels. The input image is an RGB color image. The processing target image is already stored in the HDD 206. Note that the source of the image may be a digital camera or image scanner, and any type of image such as an image generated by a rendering application may be used.

Predetermined preprocessing 302 in FIG. 3 is executed. In the embodiment, assume that the image undergoes monochrome brightness image generation processing, contrast correction processing, and Gaussian blurring processing without changing the size of the image. Note that at this stage, an image to undergo class discrimination processing is monochrome multi-value image data, each pixel of which includes 8 bits. Note also that the present invention is not limited to the above combination of the input image and preprocessing, and may be applied to any combination of an input image and preprocessing.

The processing target image having undergone the preprocessing 302 is stored at a predetermined address in the main memory 204. A discrimination processing dictionary 303 (that is, an information processing rule) is initially stored in the hard disk device 206, and is transferred to a predetermined address in the main memory 204 upon power-on of the system. In discrimination processing 304 shown in FIG. 3, the processor core 202 sequentially refers to contents of the discrimination processing dictionary 303, and executes processing for the processing target image stored at the predetermined address in the main memory 204 according to a processing rule defined by the discrimination processing dictionaries 303. The processing executed at this time will be described in detail later.

A discrimination processing result is output, as denoted by reference numeral 305, and sent to the user, an external apparatus, or post-processing.

<Direct Mapping Scheme>

In the embodiment, the cache architecture 203 of the target system is configured to use a direct mapping scheme. The cache architecture according to the embodiment will be described below with reference to FIGS. 4A and 4B.

The basic unit of the cache is called a cache line. The cache line may have various sizes, and the size of the cache line is generally set to a power of 2 bytes. In the embodiment, for the sake of descriptive convenience, assume that the data bus width of the target system is set to 8 bits and the line size is set to 4 bytes.

Note that in many existing systems, the data bus width is 32 bits or larger, and a cache line generally has a large size such as 32 bytes or larger. Although the target system having a one-stage cache configuration will be explained in the embodiment, there is a cache architecture having a multi-stage configuration from an L1 cache to an L3 cache. In the multi-stage cache architecture, a capacity generally increases away from the processor core, and the line size tends to correspondingly increase. However, the basic concept of the present invention is equally applicable, as will be described below, as a matter of course.

Figure 4A:
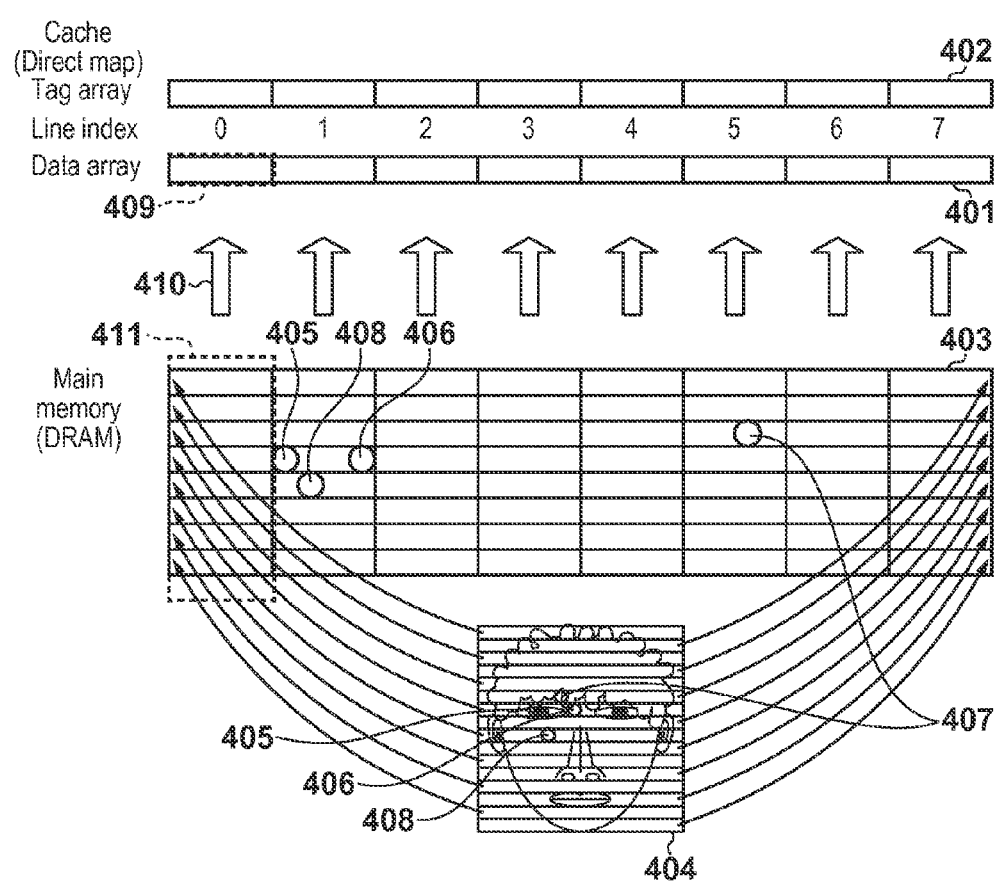
FIGS. 4A and 4B are views for explaining application to a cache architecture using a direct mapping scheme according to the embodiment.

Referring to FIG. 4A, reference numeral 401 denotes a memory called a data array which forms the cache memory of the target system. One rectangle of the data array represents a cache line. The cache memory includes eight lines having indices 0 to 7. That is, the capacity of the cache memory is 4×8=32 bytes. Note that similarly to the line size, an actual cache memory has a large number of lines in many cases, and may have a total capacity of several Kbytes to several Mbytes. In this embodiment, the cache memory has eight lines. Although the simplest configuration is described in the embodiment, it is apparent that the present invention is applicable by replacing the configuration with a cache configuration actually used.

Reference numeral 403 denotes part of the main memory 204, which serves to store discrimination target image data 404. Each cell includes four bytes, and stores data of four continuous pixels in the horizontal direction. In the embodiment, the discrimination target image data 404 includes 16×16 pixels, as described above. In the above-described cache line configuration, therefore, data of 16×8 pixels on odd-numbered lines including the first line are stored in the left half area of the main memory 403, and data of 16×8 pixels on even-numbered lines including the second line are stored in the right half area of the main memory 403.

Address ranges in the main memory 204, which are assigned to the respective lines of the data array 401, are set to be different from each other.

Figure 4B:
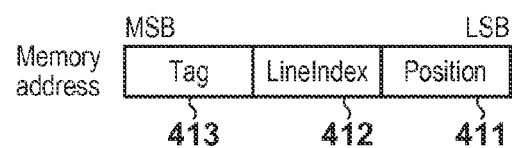

As shown in FIG. 4B, a memory address can be obtained by sequentially concatenating a position 411 within a corresponding line, a line index 412, and a tag 413 with each other from the least significant bit (LSB). In the embodiment, the line size is four bytes, and thus two bits are required to represent the position. Furthermore, since the number of lines is eight, the line index includes three bits. Assume that the address space of the bus in the system is 16 bits. In this case, the remaining 11 bits represent the tag (although many existing actual systems have a larger address space such as 32 bits or 64 bits and the line size of a cache is also larger, as a matter of course, the same description applies to them).

Each line of the data array is assigned with an area whose line index of three bits of an address in the main memory coincides with the line index (0 to 7) of the line. For example, a line 409 is assigned with an area having an address including line index 0 in the main memory. In the part of the main memory 403, a column with a line width of four bytes, which is associated with each cache line by an arrow (for example, an arrow 410) in FIG. 4A, indicates a range assigned to the cache line in the main memory. That is, when the processor 202 accesses one of rectangles (each including four bytes) 411 shown in FIG. 4A, the four bytes are stored in the line 409 of the data array of the cache, which has line index 0 and is indicated by broken lines. In this way, when the processor 202 accesses an arbitrary address in the main memory, data of one cache line (that is, four bytes) including one byte of the address is stored in the line memory of the data array of the cache, which is assigned with the address. If the processor 202 reads out data at another address within the same range, it reads a value stored in the line of the data array 401 of the cache 203 without accessing the main memory 204, thereby allowing very high-speed access.

At this time, a tag array 402 manages the lines of the data array which store values at respective addresses in the main memory. The tag array stores the tag values of the currently stored memory addresses. If the processor 202 reads out a given address, the address is divided as shown in FIG. 4B, and it is determined whether the tag value of the accessed address coincides with a value of the tag array corresponding to the line index of the accessed address. If the values coincide with each other, desired data is already stored in the data array, and thus a value in the cache 203 is read out without accessing the main memory 204 via the system bus 201. Note that the determination and switching of access are performed at a very high speed by a dedicated hardware component incorporated in the cache.

The same goes for a case in which the processor 202 writes data in the memory. However, it is necessary to additionally write back (flush) data from the cache 203 to the main memory 204 at an appropriate timing. If the system includes a plurality of bus masters, for example, if the system is a multi-core system, it is necessary to control not to cause a mismatch due to an access timing (to maintain the cache coherence), a detailed description of which will be omitted.

In the cache architecture using the direct mapping scheme, the data array 401 includes only one line and one tag for each line index. If, therefore, another address assigned to the same line in the main memory is accessed, contents of the cache line are replaced. This is called thrashing. Every time thrashing occurs, the main memory is accessed. Therefore, as the number of times of occurrence of thrashing is smaller, processing can be performed at a higher speed.

If, for example, a pixel 405 is referred to and then a pixel 406 is referred to, a cache hit occurs and thus very high-speed access is allowed, resulting in a low reference load. If, however, a pixel 407 is referred to after the pixel 405, the access speed is low unless a pixel within the same line as that of the pixel 407 has been accessed before. If a pixel 408 is referred to after referring to the pixel 405, and then the pixel 406 is referred to, thrashing occurs twice for the line with index 1, resulting in a high reference load. As described above, in this embodiment, if a cache hit occurs for a referred pixel, a low reference load is calculated; otherwise, a high reference load is calculated.

<Boosting Discriminator>

Figure 5:
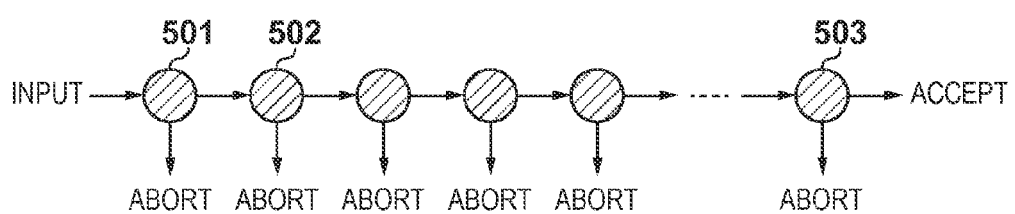
FIG. 5 is a view schematically showing cascaded Boosting type discriminators according to the embodiment.

FIG. 5 is a schematic view showing a Boosting type discriminator for performing image discrimination processing according to the embodiment. In the embodiment, the discriminator is implemented by a program executed by the target system shown in FIG. 2. As in reference 1, the discriminator is formed by a number of cascaded weak discriminators 501 to 503. Note that the discriminator shown in FIG. 5 performs abortion determination at each weak discriminator as in Japanese Patent Laid-Open No. 2010-165046 instead of performing abortion determination at each stage of a stage configuration as in reference 1. However, either configuration may be possible according to the present invention.

The first weak discriminator 501 receives a processing target image having undergone preprocessing. Each weak discriminator calculates a predetermined feature amount in the received image. In this embodiment, a point at a position different for each weak discriminator in the image is referred to, and the pixel value of the point is set as a feature amount. Each weak discriminator compares the magnitude of the feature amount with that of a predetermined discrimination threshold (the magnitude comparison relationship is different for each weak discriminator). If the comparison result is true, a discrimination result $h_k(x)=1$ is obtained; otherwise, the discrimination result $h_k(x)=-1$ is obtained. Note that x represents a discrimination target input image, and k=1, 2, . . . represents a weak discriminator number. The position of a reference point for each weak discriminator is registered as dictionary data in the above-described recognition dictionary.

Note that an integral image may be input to calculate total values within a plurality of rectangles by referring to four points, and a value obtained by multiplying each of the total values by a predetermined coefficient and totalizing the results of multiplications may be set as a feature amount, as in reference 1. Alternatively, it is also possible to obtain a discrimination result by referring to two points at predetermined positions and comparing the magnitudes of the values of the points with each other. In this embodiment, a feature amount obtained by referring to one point for each weak discriminator is adopted, for the sake of descriptive convenience. However, the present invention is applicable to a case in which a plurality of points are referred to, as a matter of course.

As dictionary data for each weak discriminator, a confidence $\alpha_k$ and a discrimination threshold $T_k$ different from the above-described discrimination threshold are registered. The confidence $\alpha_k$ and the discrimination threshold $T_k$ are parameters determined upon learning of the kth weak discriminator. The discrimination result score of each weak discriminator is calculated by $\alpha_k h_k$. Each weak discriminator adds its discrimination result score to an accumulated score sent from the preceding stage, and performs abortion determination based on the discrimination threshold $T_k$. That is, abortion determination at the tth stage is given by:

$$\sum_{k=1}^{t} \alpha_k h_k(x) > T_t \qquad (1)$$

If inequality (1) is satisfied, the processing continues, and the weak discriminator sends, to the next stage, the added accumulated score, as given by:

$$\sum_{k=1}^{t} \alpha_k h_k(x)$$

That is, referring to FIG. 5, each of the second weak discriminator 502 and the subsequent weak discriminators receives the accumulated score of the preceding stage together with the processing target image.

If the processing is not aborted in the final weak discriminator 503, it is confirmed that the discrimination result is positive. The accumulated score at this time indicates the "likelihood" that the input image includes a discrimination target object.

<Boosting Learning Processing>

Learning processing of generating a recognition dictionary for a Boosting type discriminator according to the embodiment will be described with reference to a flowchart shown in FIG. 1. The learning processing may be executed on the target system shown in FIG. 2A or executed using another system such as a higher-speed super computer or PC cluster. The present invention does not limit the execution environment of the learning processing.

A learning algorithm according to the embodiment will be described below.

In step S101, a large amount of sample data to be used for learning is input. The learning data includes discrimination target patterns (positive samples such as face image data) and non-discrimination target patterns (negative samples such as non-face image data like the background) at a predetermined ratio. Note that the sample data have undergone necessary preprocessing such as brightness image generation processing and Gaussian filter processing.

In step S102, a weighting factor for each sample data item of a learning data set is initialized. Let i be the total number of learning data items (including positive and negative samples). Then, all the weighting factors $w_{t,i}$ are equally initialized, as given by:

$$w_{1,i} = 1/m, \ m=1, \ldots, m \qquad (2)$$

where t represents the weak discriminator number currently used for learning and has an initial value of 1, and i represents the learning data number. That is, in learning of the weak discriminator of the first stage, a common weight is assigned to all the sample data.

In step S103, a reference record table is initialized. The reference record table is used to sequentially store the positions of feature pixels referred to by the weak discriminators of respective stages which have already performed learning immediately before this step. The table is cleared to an initial state in which no position information is held.

The table is used to perform cache hit determination by simulating the cache architecture of the target system. If the cache of the target system uses the direct mapping scheme, it is necessary to enable the reference record table to hold at least one or more access records immediately before this step for each line index.

Note that instead of holding reference pixel position information intact as the reference record table, the reference pixel position information may be indirectly held by converting it into information equivalent to the tag array described with reference to FIG. 4 to cope with the architecture of the target system.

In step S104, processing of normalizing the weighting factor is performed, as given by:

$$w_{t,i} \leftarrow \frac{w_{t,i}}{\sum_{j=1}^{m} w_{t,j}} \qquad (3)$$

Note that when step S104 is executed for the first time, at the time of learning of the first stage, the weighting factor $w_{1,i}$ has been set to the value set in step S102 (equation (2)), and already satisfies expression (3). That is, step S104 is processing of performing normalization so that the total value of the weighting factors $w_{1,i}$ becomes 1 in learning of the second or subsequent discriminator.

In step S105, one candidate position of a pixel value feature to be referred to by the weak discriminator is selected. The candidate position may be an arbitrary point in the processing target image, or may be selected within a range limited to some extent. If a feature obtained by referring to a plurality of points such as the above-described rectangular feature or a pixel difference is used, a large number of combinations of feature candidates are prepared in advance and one of them is selected.

In step S106, discrimination performance evaluation is performed for the selected feature candidate. For each of all the learning sample data, the pixel value of the position of the feature candidate is referred to, and a threshold $\theta_{t,j}$ for differentiating between a discrimination target and a non-discrimination target is determined. Note that t represents the number of a weak discriminator which is performing learning, and j represents a feature candidate number.

Figure 6A:
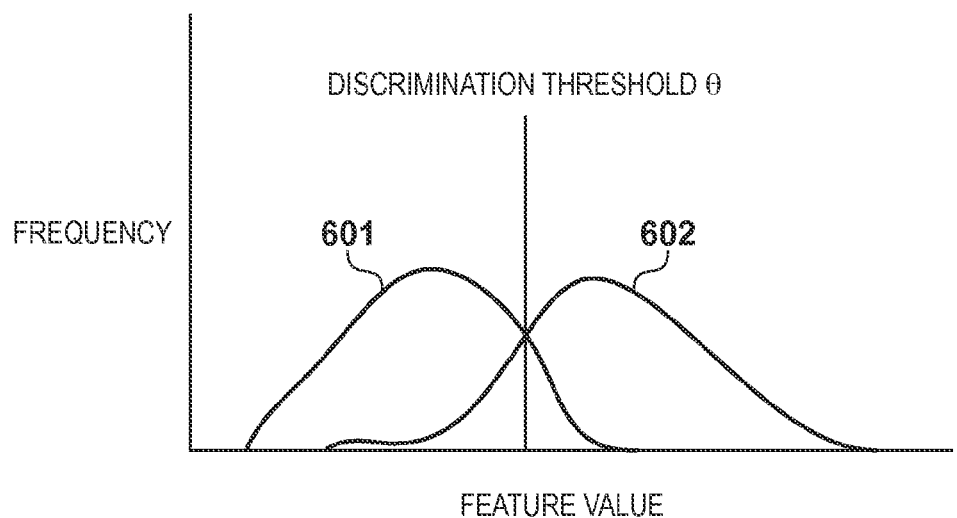
FIGS. 6A and 6B are graphs for explaining two kinds of threshold determination methods in the Boosting type discriminator.

The threshold is determined using a reference pixel value histogram created using all the learning sample data. FIG. 6A shows an example of a discrimination target data histogram 602 and non-discrimination target data histogram 601. The abscissa represents the reference pixel value (feature value) at a feature candidate position, and the ordinate represents the number of sample data items, the reference pixel value of which is a corresponding value. The threshold $\theta_{t,j}$ for optimally differentiating between a discrimination target and a non-discrimination target is determined using the histograms. By determining a discrimination target if a reference pixel value is larger than the threshold $\theta_{t,j}$, and determining a non-discrimination target if a reference pixel value is smaller than the threshold $\theta_{t,j}$, an "error rate" at which a non-discrimination target is erroneously determined as a discrimination target or discrimination target is erroneously determined as a non-discrimination target becomes minimum. If the peaks of the discrimination target data histogram 602 and non-discrimination target data histogram 601 appear at horizontally opposite positions, the magnitude comparison relationship with the threshold is reversed. That is, if a reference pixel value is smaller than the threshold $\theta_{t,j}$, a discrimination target is determined, and if a reference pixel value is larger than the threshold $\theta_{t,j}$, a non-discrimination target is determined.

A weighted discrimination error rate for all the learning sample data is calculated using the determined threshold $\theta_{t,j}$ and the weighting factor normalized by expression (3). The weighted discrimination error rate is given by:

$$E_{t,j} = \Sigma_i w_{t,i} |h_{t,j}(x_i) - y_i| \tag{4}$$

Note that i represents the learning sample data number and $x_i$ represents each learning sample data item. $h_{t,j}(x_i)$ indicates the discrimination result of the learning sample data $x_i$ based on the feature candidate j, and outputs 1 if the input target data $x_i$ is determined as a discrimination target using the previously determined threshold $\theta_{t,j}$ and magnitude comparison relationship, or outputs −1 if the input target data $x_i$ is determined as a non-discrimination target. $y_i$ indicates a correct answer label (teaching label), and is assigned with 1 or −1 depending on whether the ith sample data is a discrimination target. The weighted error rate $E_{t,j}$ is a total value added with 0 for a sample for which $h_{t,j}(x_i)$ equals $y_i$, or $2w_{t,j}$ for a sample for which $h_{t,j}(x_i)$ does not equal $y_i$.

In step S107, cache hit determination is performed using the reference record table when referring to the pixel position of the feature candidate. If a cache hit occurs for the pixel of the feature candidate, its reference load is low; otherwise, thrashing occurs, resulting in a high reference load. Note that the reference load indicates a load generated when the target system accesses data, as described above. This determination processing is performed according to a flowchart shown in FIG. 7.

In step S701, a memory address at which the pixel value of the reference pixel is stored is calculated using the coordinates of the pixel position of the feature candidate and the first address of a storage area for the processing target image. The first address used at this time is the first address set as a processing target image storage area in the memory of the target system, and is irrelevant to the memory address of the system for which the learning processing is being performed.

In step S702, a tag value and index value are obtained from the calculated address of the reference pixel position. To do this, as described with reference to FIG. 4B, it is only necessary to fetch a bit string of a predetermined range from the address value. In this embodiment, the index value is represented by three bits and the tag value is represented by 11 bits, as described above.

In step S703, by referring to the reference record table, it is determined whether a cache hit occurs. The reference record table sequentially stores pixel positions accessed so far. The tag array is simulated to create a table for holding equivalent information, pieces of position information of referred pixels are sequentially fetched from the beginning, and a tag value and index value are calculated like in steps S701 and S702, thereby updating the information corresponding to the tag array. Since this can reproduce information corresponding to the tag array when the pixel position of the current feature candidate is accessed, cache hit determination can be performed based on whether the same value as the tag value fetched in step S702 is stored in a line with the index value fetched in step S702. Note that as described above, instead of holding records of the coordinates of pixel positions intact as the reference record table, each record may be converted, in advance, into information corresponding to the tag array and held, as a matter of course.

A hit determination result is returned in step S704. Note that if a feature obtained by referring to a plurality of points as described above is used, it is only necessary to determine whether a cache hit occurs when sequentially referring to the respective points in a predetermined order, and set an average at this time as a cache hit rate, which is returned as a determination result.

The cache hit determination result in step S107 is represented by $c_{t,j}$, which takes 1 if a hit occurs and 0 if no hit occurs. If $c_{t,j}$ is calculated as a hit rate, it takes a value between 0 and 1.

In step S108, based on the cache hit determination result (or hit rate) determined in step S107, an access penalty $P_{t,j}$ is calculated and added to the weighted error rate $E_{t,j}$. The access penalty $P_{t,j}$ takes a larger value as the reference load is higher, as given by:

$$P_{t,j} = K(1 - c_{t,j})$$

where K represents a predetermined positive coefficient which is used to adjust the ratio at which the reference load is considered as a penalty. That is, if a cache hit is determined in step S107, $P_{t,j} = 0$; otherwise, $P_{t,j} = K$. If the determination result is calculated as a cache hit rate, it takes a value between 0 and K. An error rate $E_{Pt,j}$ obtained by considering the access penalty is given by:

$$E_{Pt,j} = \Sigma_i w_{t,i} |h_{t,j}(x_i) - y_i| + K(1 - c_{t,j}) \tag{5}$$

Note that a value proportional to the total number of system clocks required by the target system to calculate a feature amount by referring to the feature candidate may be used as the access penalty $P_{t,j}$, instead of the cache hit rate.

The aforementioned processing in steps S105 to S108 is performed for all feature candidates by repetitive processing in step S109, and then the error rate $E_{Pt,j}$ represented by equation (5) and obtained by considering the access penalty $P_{t,j}$ is obtained for each feature candidate.

In step S110, a feature candidate j (corresponding to the position of a candidate pixel feature in this embodiment) having a smallest one of the calculated error rates $E_{Pt,j}$ obtained by considering the access penalties $P_{t,j}$ for all the feature candidates is selected (argmin($E_{Pt,j}$)), and is set as a feature amount for the tth weak discriminator, thereby determining a reference pixel position. Note that the error rate $E_{t,j}$ before adding the access penalty $P_{t,j}$ of the selected feature is represented by $E_t$. The threshold $\theta_{t,j}$ determined using the feature candidate j in step S106 is set as a discrimination threshold $\theta_t$.

In step S111, the reference record table is updated. In this example, the determined position information of the reference pixel of the tth stage is additionally stored in the reference record table. (Or, if the position information is held as information corresponding to the tag array, an address is calculated and a tag value and index value are obtained in steps S701 and S702 of FIG. 7, and tag information having the obtained index value is rewritten.)

In step S112, a confidence $\alpha_t$ corresponding to the current weak discriminator is calculated by:

$$\alpha_t = \log\left(\frac{1 - E_t}{E_t}\right) \tag{6}$$

In step S113, an abortion threshold is determined. In this example, the histogram of an accumulated score value, which is created using all the learning sample data, is used. The accumulated score is given by:

$$\Sigma_{k=1}^t a_k h_k(x)$$

Figure 6B:
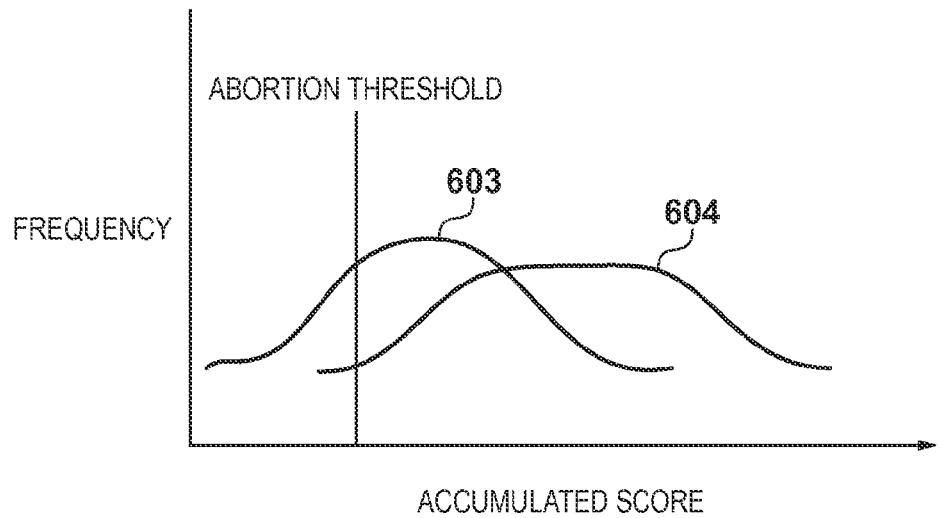

FIG. 6B shows an example of an accumulated score value histogram 604 of discrimination target data and an accumulated score value histogram 603 of non-discrimination target data. The abortion threshold is determined so that the ratio of data to be aborted to discrimination target data (the number of positive data items to be aborted/the total number of positive data items) falls within a predetermined tolerance range. The number of positive data items to be aborted indicates the total number of positive data items on the left side of the abortion threshold in the accumulated score histogram 604. The number of negative data items to be aborted is preferably larger, and thus the negative data need not be considered. This abortion threshold is a discrimination threshold $T_t$ for the tth weak discriminator used in discrimination processing.

The parameters of the thus determined reference pixel position, confidence $\alpha_t$, discrimination threshold $\theta_t$, magnitude comparison relationship, and discrimination threshold $T_t$ are stored as dictionary data of the tth weak discriminator.

In step S114, the weighting factor for each learning sample data item is updated, as given by:

$$w_{t+1,i} = w_{t,i} \times \left(\frac{E_t}{1-E_t}\right) \qquad (7)$$

Note that the weighting factor $w_{t,j}$ updated according to equation (7) indicates only the weighting factor of correctly discriminated learning data i. Since the error rate $E_t$ generally has a value smaller than 0.5, the weighting factor $w_{t,i}$ of the correctly discriminated sample data (both positive and negative data) is updated to be smaller. Therefore, the weighting factor $w_{t,i}$ for erroneously discriminated sample data is relatively large.

After additionally generating the tth weak discriminator in the above processing (steps S104 to S114), it is determined in step S115 whether a discriminator that satisfies a predetermined completion condition is complete. The predetermined condition is satisfied when the number of weak discriminators reaches a preset upper limit number, or when the error rate $E_t$ becomes smaller than a predetermined value to achieve desired performance. If the condition is not satisfied, the process returns to step S104 to continue the processing of additionally generating a weak discriminator.

<Boosting Discrimination Processing>

Figure 8:
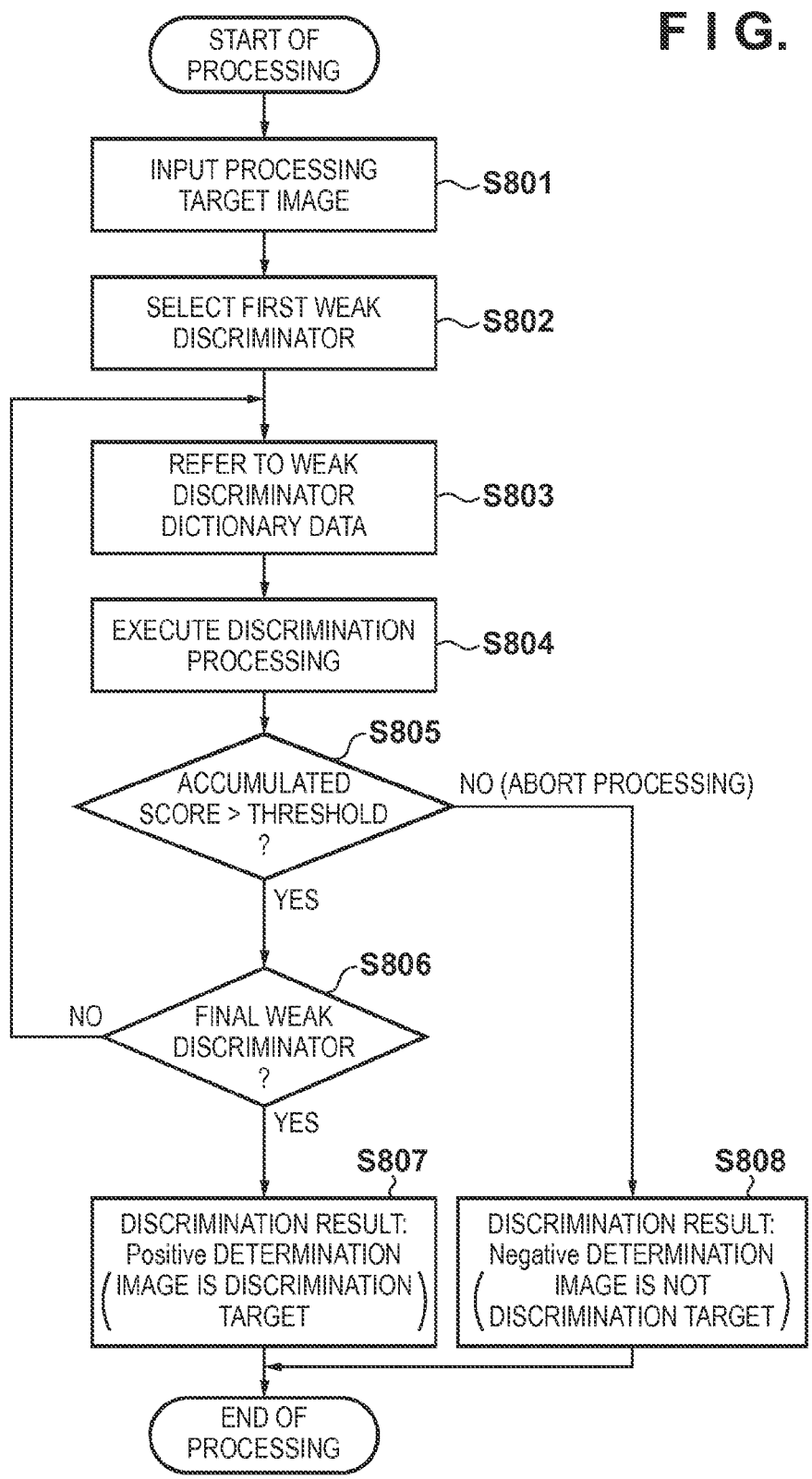
FIG. 8 is a flowchart for explaining the procedure of discrimination processing by the Boosting type discriminator.

Discrimination processing using the discrimination processing dictionary generated as described above is executed on the target system according to a flowchart shown in FIG. 8 similar to general Boosting type discrimination processing.

In step S801, a discrimination target image x is input. Note that the image has already undergone the above-described predetermined preprocessing such as brightness image generation processing and Gauss blurring processing.

In step S802, a weak discriminator of the first stage is selected (a processing stage t=1).

In step S803, the discrimination processing dictionary is referred to, and the parameters of the reference pixel position, confidence $\alpha_t$, discrimination threshold $\theta_t$, magnitude comparison relationship, and discrimination threshold $T_t$ as the features of the weak discriminator of the selected processing stage are referred to.

In step S804, the discrimination processing of the tth weak discriminator is performed. As described above, the discrimination result $h_t(x)$ of each weak discriminator is calculated using the referred discrimination threshold $\theta_t$ and magnitude comparison relationship, and then an accumulated score value is calculated, as given by:

$$\Sigma_{k=1}^{t} \alpha_k h_k(x)$$

In step S805, if it is determined according to inequality (1) that the accumulated score is not larger than the discrimination threshold $T_t$, the process is to be aborted and thus the process advances to step S808 to confirm that the input discrimination target image x is not a discrimination target (negative).

If it is determined in step S805 that the accumulated score is larger than the discrimination threshold $T_t$ and the process continues, the process advances to step S806 to check whether the executed weak discriminator is a discriminator of the final stage. If the weak discriminator is not a discriminator of the final stage, the process returns to step S803 to execute the discrimination processing of the next weak discriminator.

If the weak discriminator of the final stage has been reached, the process advances to step S807 to confirm that the input discrimination target image x is a discrimination target, that is, "positive".

As described above, in the embodiment, the occurrence of thrashing is suppressed by considering an access penalty obtained in consideration of the cache architecture of the target system for executing the discrimination processing in addition to the discrimination performance when sequentially selecting the features of the weak discriminators of the respective stages. This can generate a discrimination processing dictionary for a Boosting type discriminator, which achieves excellent discrimination performance and high speed.

[Second Embodiment]
<Sliding Window Processing>

When detecting a desired object such as a human face from a large image, discrimination processing combined with sliding window processing is often performed. For example, sliding window processing is also used in reference 1.

Figure 9:
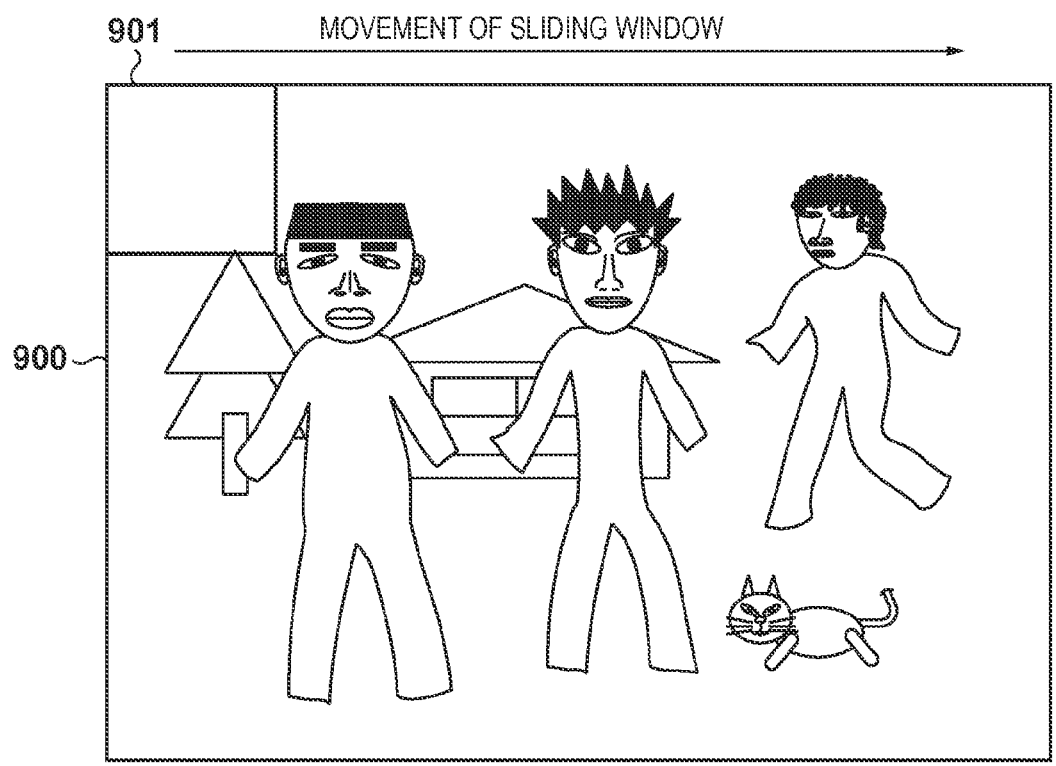
FIG. 9 is a view for explaining sliding window processing.

FIG. 9 is a view for explaining the sliding window processing. Reference numeral 900 denotes an input image; and 901 is a sliding window (sub window) with a predetermined size set on the input image 900. The sliding window 901 moves from the upper left corner toward the right by a predetermined number of pixels on the input image 900. When the sliding window 901 reaches the right edge, it moves to the left edge at a position the predetermined number of pixels below, and continues the movement to the lower right corner of the image. Every time the sliding window 901 moves once, an image within the sliding window is extracted and input to the same discriminator as that in the first embodiment, thereby discriminating whether the image is a discrimination target image. That is, the presence of a desired object is detected at the position of the sliding window at which it has been determined that the image is a discrimination target.

The present invention is also applicable to a case in which the detection processing combined with the sliding window processing is performed.

If an image within the sliding window is input to the discriminator, it is inefficient to execute processing by copying the image from the original input image to another area of a memory. Such operation results in a large number of memory copy processes since the number of pixels by which the sliding window moves may be set to one. To avoid this, in general, discrimination processing is executed by setting the region position of the sliding window on the input image, and referring to the memory area in which the discriminator directly stores the input image.

Figure 10:
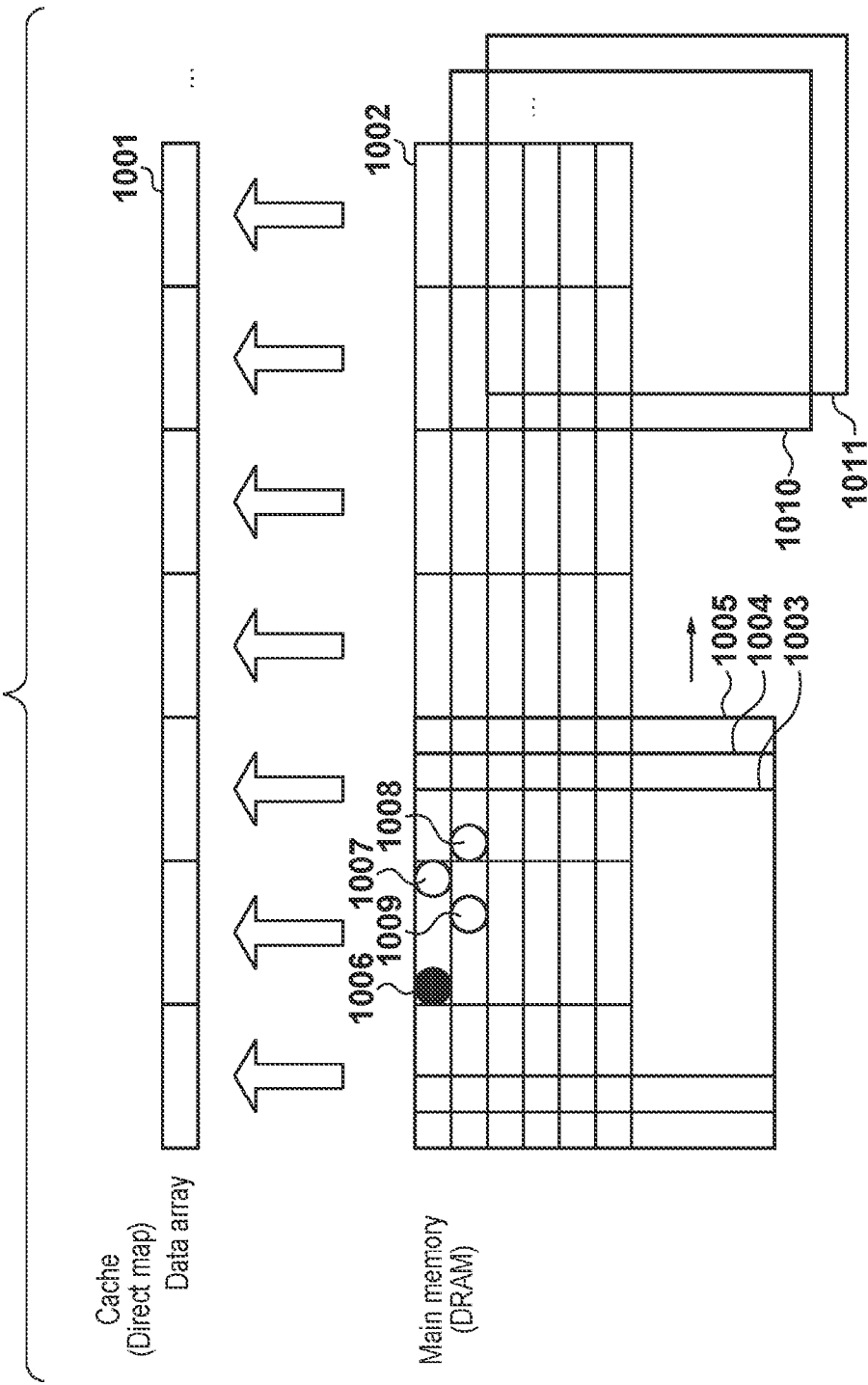
FIG. 10 is a view for explaining an operation when the cache architecture using the direct mapping scheme executes the sliding window processing according to an embodiment.

FIG. 10 is a view for explaining application of the present invention in the detection processing including the sliding window processing, and shows the cache architecture of a target system. Although a target system according to this embodiment includes a cache using the direct mapping scheme as in the first embodiment, the application of the present invention is not limited to this.

For the sake of descriptive convenience, in the cache shown in FIG. 10, (cache line size×number of lines) of the cache coincides with the number of pixels of the width of an input image to be processed. That is, the number of lines is larger than that of the cache described above with reference to FIG. 4. This is for the purpose of illustration, and the present invention is applicable to a case in which the above condition is not satisfied, as a matter of course. Note that a tag array and line indices are omitted in FIG. 10 but they actually exist as in FIG. 4. Assume that the capacity for one cache line is four bytes as in FIG. 4.

Referring to FIG. 10, reference numeral 1001 denotes a data array; and 1002, part of a main memory which stores the input image 900 shown in FIG. 9. Similarly to FIG. 4, the respective lines of the data array 1001 are respectively assigned with the areas of the part 1002 of the main memory, as indicated by arrows.

Reference numeral 1003 denotes a sliding window (assume that it has a size of 10×10 pixels) arranged at the upper left corner of the input image. The sliding window slides by one pixel, as denoted by reference numerals 1004 and 1005.

When the sliding window is at the position 1003, it is possible to determine whether a cache hit occurs for each pixel position to be referred to after referring to a pixel position 1006, as in the first embodiment. For example, if a pixel at a position 1007 is referred to, a cache hit occurs. However, no cache hit occurs for a position 1008. If a position 1009 is referred to, thrashing occurs.

When combined with the sliding window processing, the reference pixel position of each feature is set with respect to the sliding window. That is, as the sliding window moves, the reference pixel position of one feature relatively moves.

If, therefore, the sliding window moves to the position 1004, a pixel immediately adjacent to the right of the pixel position of each feature referred to when the sliding window is at the position 1003 is referred to. That is, when the sliding window is at the position 1004, even if a pixel at the position 1006 is referred to and then a pixel at the position 1007 is referred to, no cache hit occurs.

Even when used for the detection processing combined with the sliding window processing, it is basically possible to generate a discrimination processing dictionary by the learning processing procedure described with reference to FIG. 1. Note that a cache hit determination result depends on not only reference records but also the position of the sliding window, which needs to be considered. In this embodiment, therefore, processing shown in FIG. 18 is used as the cache hit determination processing in step S107 of FIG. 1 instead of the processing shown in FIG. 7 described in the first embodiment to calculate a cache hit rate $c_{i,j}$ between 0 and 1.

Note that in the embodiment, images input as a learning data set in step S101 of FIG. 1 are extracted in advance to have the size of a sliding window. That is, in the system for learning processing, positions in the memory at which the learning images are stored are irrelevant to the storage position of discrimination target data in discrimination processing. In learning processing, the following hit rate calculation is performed by assuming (simulating) that the position of part of a large image to undergo the sliding window processing in the target system is set by a sliding window having the same size as that of the learning image, and that part is referred to.

Figure 18:
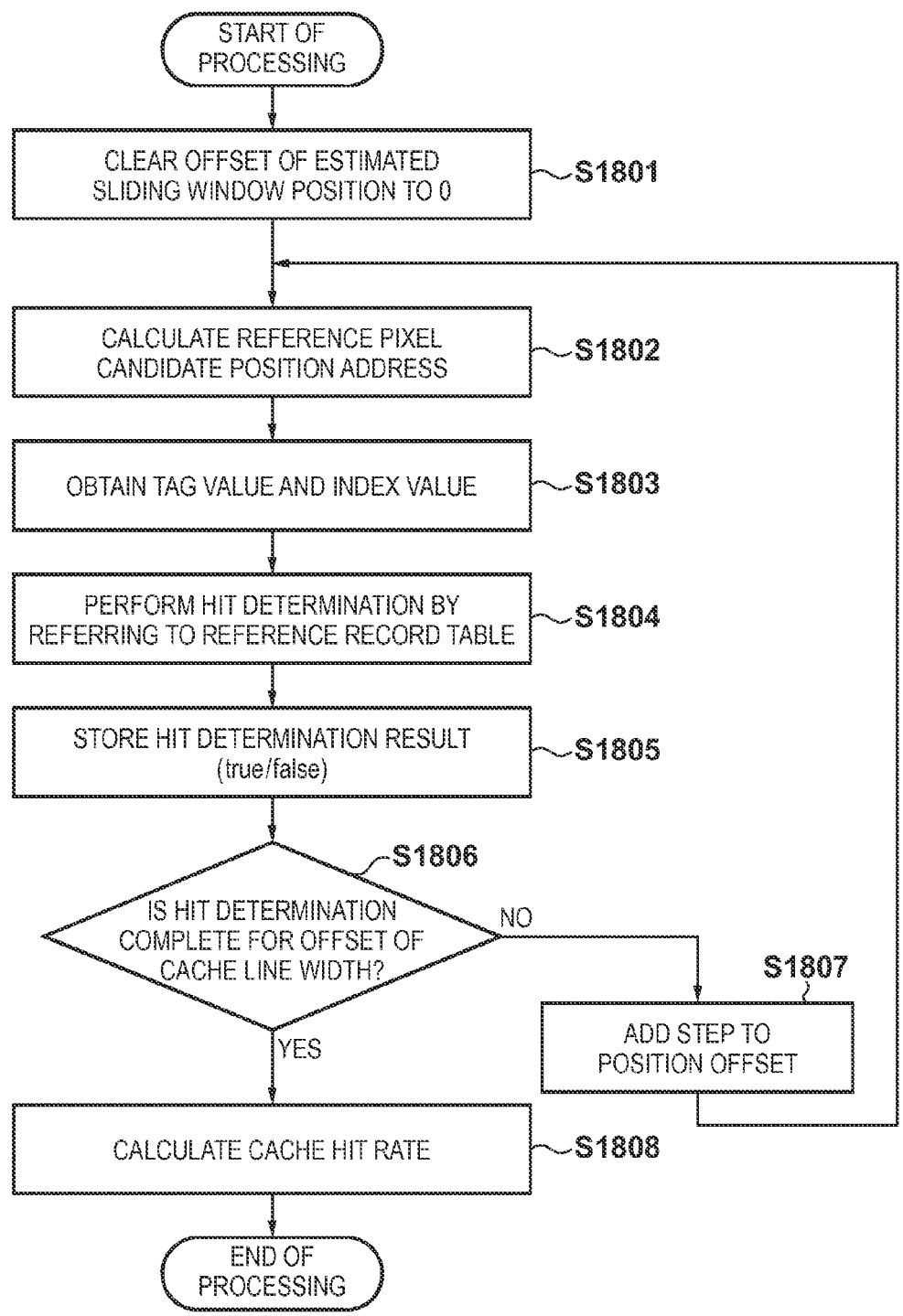
FIG. 18 is a flowchart illustrating another example of cache hit determination processing.

Referring to FIG. 18, the offset of the estimated position of the sliding window is set to 0. This corresponds to setting the position of the sliding window to the beginning of any one of cache lines on the main memory. For example, the position is set to the position 1003 shown in FIG. 10. Note that if the offsets of the positions of the sliding windows, that is, the numbers of pixels by which the sliding windows slide from the beginnings of cache lines toward the right, respectively, are equal to each other, the same result of determining whether a cache hit occurs is obtained. For example, the hit determination result of a given reference pixel candidate when the sliding window is at a position 1010 shown in FIG. 10 is the same as that obtained when the sliding window is at the position 1003. A hit determination result obtained when the sliding window is at a position 1011 is the same as that obtained when the sliding window is at the position 1004. It is, therefore, possible to calculate a cache hit rate (average) as a whole by performing hit determination for an offset of the cache line width.

In step S1802, the memory address of the position of a reference pixel candidate on the target system when the sliding window is at an offset position is calculated. Although this processing is the same as that in step S701 of FIG. 7, an address is calculated by shifting the x-coordinate toward the right by the offset.

Figure 7:
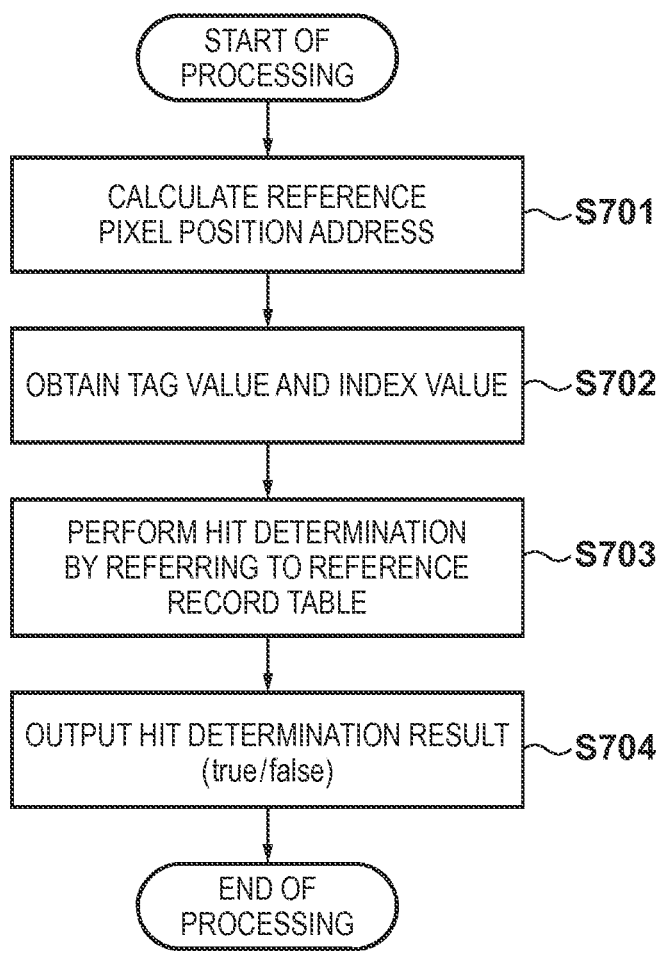
FIG. 7 is a flowchart illustrating an example of cache hit determination processing in the learning processing.

In step S1803, a tag value and index value are obtained from the calculated address, similarly to step S702 of FIG. 7.

In step S1804, cache hit determination is performed by referring to a reference record table. At this time, determination is performed by simulating a tag array like in step S703 of FIG. 7. However, when the position information of a referred pixel is fetched from the reference record table, an address is calculated by adding the offset to the x-coordinate, similarly to step S1803. Note that if the reference record table is converted into information corresponding to a tag array and held, a record changes depending on the offset position, and thus it is necessary to store different information corresponding to a tag array for each offset position.

In step S1805, the result of determining whether a hit occurs is temporarily stored. In step S1806, it is determined whether hit discrimination is complete for the offset of the cache line width. If hit discrimination has not been completed, a next offset value is calculated in step S1807. In this example, the width (step) by which the sliding window slides at a time is added to the current offset value. Note that the number of pixels of the step is a value which can divide the number of pixels of the cache line width. The process then returns to step S1802 to perform cache hit determination at the next position offset.

If hit discrimination for the cache line width is complete, in step S1808 a cache hit rate is calculated by obtaining the total number of cache hits, and setting the number of determined offsets as a denominator, thereby completing the process.

As described above, according to the second embodiment, the present invention is also applicable to the desired object detection processing combined with the sliding window processing, thereby allowing generation of a discrimination processing dictionary which achieves the detection performance and high speed.

[Third Embodiment]
<Set Associative Cache>

The present invention is also applicable to a case in which a target system having a cache architecture of another type is used.

FIG. 11 shows a cache architecture using a 2-way set associative cache scheme. Assume that this cache has a cache line size of four bytes and line indices 0 to 7 for eight columns, similarly to the direct mapping scheme shown in FIG. 4.

The data array of the cache using the set associative scheme is assigned with a capacity of a plurality of lines for each line index. The number of lines assigned for each index will be referred to as the number of ways. The cache shown in FIG. 11 has two ways.

A tag array is configured to hold tags the number of which is equal to the number of ways for each index. Referring to FIG. 11, each upper tag stores information for managing a corresponding upper line, and each lower tag stores information for managing a corresponding lower line. Each tag of the tag array is assigned with a time stamp holding area (not shown), which stores the last access time of each upper or lower line.

Cache hit determination is the same as that in the direct mapping scheme up to the fetch of an index and tag from an accessed address. If the fetched tag coincides with one of upper and lower tags corresponding to the index, a hit is determined. Simultaneously with access to a corresponding cache line of the data array, the last access time of the time stamp holding area is updated.

If no cache hit occurs, the time stamp holding area is referred to, a tag accessed at the earliest time is selected, and the contents of a corresponding line are replaced with those of a line including a new address. (That is, a line accessed at the earliest time is subject to thrashing.) At the same time, the last access time is updated.

The present invention is applicable to even a case in which the target system has the cache architecture shown in FIG. 11, and it is possible to generate a discrimination processing dictionary according to, for example, the learning processing procedure shown in FIG. 1. In this case, cache hit determination in step S107 is performed according to the architecture shown in FIG. 11 as described above, as a matter of course. Unlike the direct mapping scheme, each index has two lines, so a hit rate increases and thrashing is difficult to occur.

Referring to FIG. 11, for example, a state in which lines of a discrimination target image 1104 are separately stored in left and right areas as in FIG. 4A is considered. A case in which a pixel 1105 is accessed, a pixel 1107 is accessed, and then a pixel 1106 is accessed will be described. At this time, thrashing occurs twice in the direct mapping scheme shown in FIG. 4A. In the cache shown in FIG. 11, both the lines are held in the cache. Therefore, when the pixel 1106 is accessed, a cache hit occurs.

In the 2-way architecture shown in FIG. 11, a reference record table needs to hold at least two past access histories for each line. Alternatively, each record may be converted into information corresponding to a tag array and held, similarly to the direct mapping scheme.

In addition, it is apparent that there are also cache architectures using a 4- or 8-way set associative scheme to which the present invention is equally applicable.

As compared with the direct mapping scheme, the set associative scheme improves the cache hit rate but has a demerit that the effective capacity of the cache relatively decreases because a capacity required by a tag array increases as the number of ways increases. Which of these schemes is more appropriate depends on processing to be executed. If a feature such as a rectangular feature or pixel difference calculated by referring to a plurality of points is used, the set associative cache scheme can ensure high speed while maintaining the degree of freedom of feature selection, as compared with the direct mapping scheme. Therefore, the effect of readily attaining excellent discrimination performance and high-speed processing can be expected.

[Fourth Embodiment]
<Texture Memory>

Figure 12A:
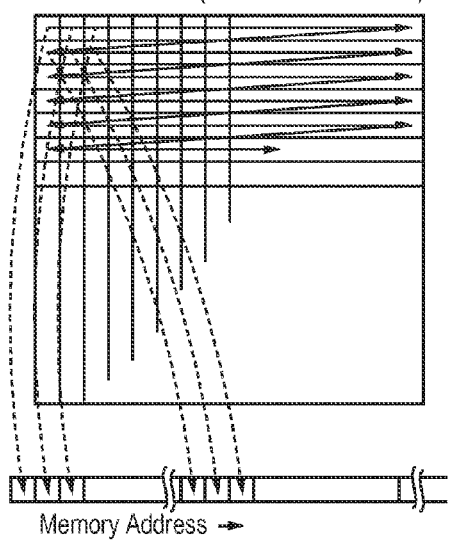
FIGS. 12A to 12C are views for explaining an example of a rule for storing data in a memory and an address calculation method.

To store an image in a main memory, pixels of one line of an image are generally stored at continuous addresses by a raster scan scheme in many cases. FIG. 12A shows a case in which an image is stored in a memory by the raster scan scheme.

Figure 2B:
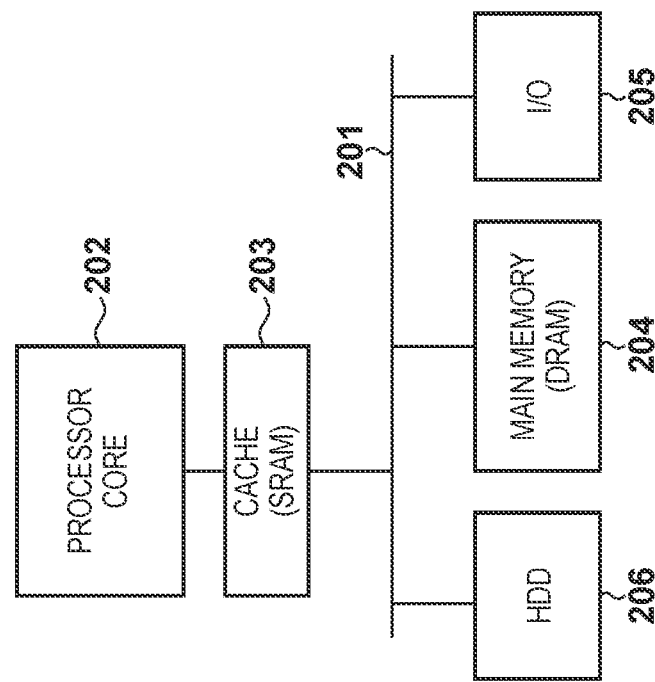
Figure 12B:
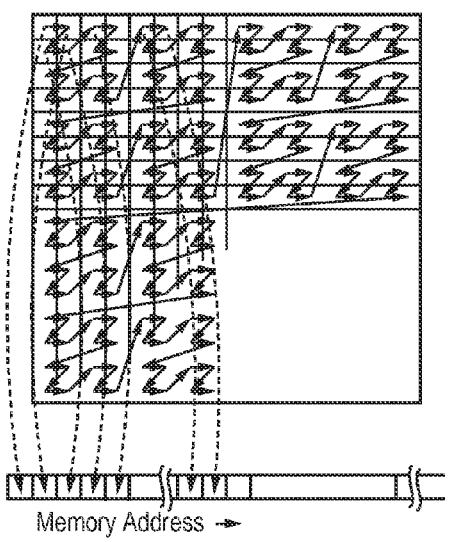

There is also an architecture for storing an image in the memory according to a different storage rule. For example, FIG. 12B shows a case in which an image is stored in the memory in an order by a Z-ordering scheme. If pixels are stored in the memory in such order, pixels adjacent to each other not only in the horizontal direction but also in the vertical direction tend to be stored at the positions of memory addresses close to each other. With this operation, pixels to undergo burst transfer or included in one line of the cache are adjacent to each other in the horizontal and vertical directions, thereby increasing the efficiency of access to adjacent pixels regardless of the direction. A memory (texture memory) using the Z-ordering scheme is often connected to a system as a memory different from the main memory, as shown in FIG. 2B. The texture memory having such storage rule is used in, for example, a GPU, and is especially advantageous in performing enlargement/reduction processing or the like including pixel interpolation for part of an image.

Note that in this specification, a method of determining an order in which the respective elements of target data are stored in the memory, such as the raster scan scheme or Z-ordering scheme, is referred to as a "storage rule".

The present invention is applicable to a target system including a memory architecture having a storage rule such as the Z-ordering scheme different from the raster scan scheme, in which a discrimination target image is stored. In this case, for example, it is also possible to generate a discrimination processing dictionary by applying the learning processing procedure shown in FIG. 1.

A reference pixel position address calculation method in step S701 of FIG. 7 in cache hit determination in step S107 is different from that in the above-described embodiments.

Figure 12C:
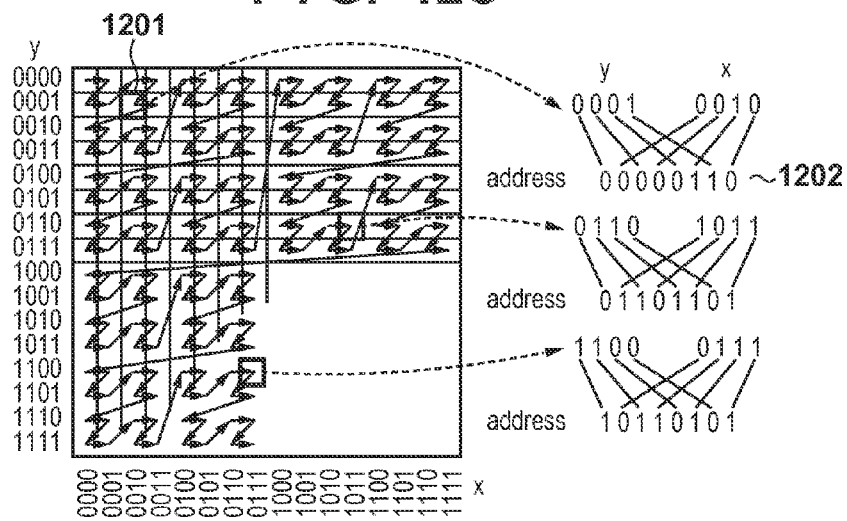

FIG. 12C shows an address calculation method when a 16×16 image is stored in the texture memory using the Z-ordering scheme. For example, a pixel at a position 1201 has an x-coordinate of 2 and a y-coordinate of 1. These coordinates are represented by binary numbers. Then, a storage address (6 in this case) can be calculated by setting the least significant bit of the x-coordinate as the least significant bit, and then alternately arranging the bits of the y-coordinate and the remaining bits of the x-coordinate, as denoted by reference numeral 1202. It is apparent from FIG. 12C that it is possible to calculate an address for another position in the same manner. Note that it is possible to readily calculate an address according to the Z-ordering storage rule, but the image needs to be a square whose side has a size of a power of 2. When storing an image having another size, the region of a smallest square whose side has a size of a power of 2 and which includes the image is ensured and stored with a margin. The hardware of the texture memory generally incorporates hardware for converting a coordinate value into an address value. A system for executing learning processing need not include a memory using the Z-ordering scheme, and need only perform equivalent address calculation by software, as a matter of course.

A cache hit determination method after address calculation is the same as that in the above-described embodiments.

If the present invention is applied to a target system including a texture memory as in this embodiment, pixels at adjacent positions not only in the horizontal direction but also in the vertical direction tend to be selected as features with high access efficiency. Therefore, the effect of improving the discrimination performance while maintaining high processing speed can be expected.

It is also apparent that the present invention is not limited to the memory architecture using the Z-ordering scheme and is applicable to even a memory architecture having another storage rule such as a Hilbert curve by applying a corresponding address calculation method

[Fifth Embodiment]

<Random Fern Type Discriminator>

The present invention is applicable not only to discrimination processing using a Boosting type discriminator but also to discrimination processing using a discriminator of a different type.

FIG. 13A shows a tree type discriminator obtained by combining binary trees, as described in reference 3. FIG. 13B shows a fern type discriminator, as described in reference 4. In this embodiment, a case in which the present invention is applied to the fern type discriminator will be described. Before that, the operation of the tree type discriminator will be explained.

Referring to FIG. 13A, nodes $f_0$ to $f_6$ calculate binary features, respectively. Any feature can be used as a binary feature as long as the feature allows obtaining of a binary discrimination result. In this embodiment, assume that a feature (pixel difference feature) for comparing the magnitudes of the pixel values of two points at positions determined for each node in an input discrimination target image is used, and it is determined whether the pixel value of the first point is larger than that of the second point.

The present invention is not specifically limited to this, as a matter of course. For example, one point may be referred to and the magnitude of the pixel value of the point may be compared with a predetermined threshold, as in the first embodiment. Or, a rectangular feature may be used as in reference 1 as long as binary discrimination is finally performed.

If a node determination result is true (1), the process advances to a right child node. On the other hand, if the result is 0 (false), the process advances to a left child node. Discrimination is performed three times using three of the seven binary features of the nodes $f_0$ to $f_6$, and one of eight leaves $l_0$ to $l_7$ is finally reached. The probability that the discrimination target image belongs to each class is held as a parameter for each leaf. Discrimination is performed for the discrimination target image by a plurality of other similar trees, the probabilities of reached leaves are summed for each class, and then a class having a highest probability is confirmed as a discrimination result. That is, the tree type discriminator is a discriminator capable of performing multi-class discrimination.

FIGS. 13B and 13C show the fern type discriminator. The nodes of the tree type discriminator discriminate different binary features. To the contrary, in the fern type discriminator, nodes at the same layer use the same binary feature. That is, the fern type discriminator which classifies data into eight leaves like the three type discriminator shown in FIG. 13A is as shown in FIG. 13B. Note that the three binary features of the nodes $f_0$ to $f_2$ are used regardless of the child node of the tree. As shown in FIG. 13C, therefore, it is possible to perform only discrimination of the three binary features first, generating a bit string by concatenating discrimination results (0 or 1), and then determining a leaf using the generated bit string as an index. If, for example, determination results $f_0=0$, $f_1=1$, and $f_2=0$ are obtained, they are concatenated to obtain a bit string (010)b=2, thereby allowing selection of the leaf $l_2$. This result is the same as that obtained by following the tree shown in FIG. 13B.

The discrimination processes of the three binary features of the nodes $f_0$ to $f_2$ may be performed in any order as long as the discrimination results of the nodes $f_0$ to $f_2$ are concatenated in the order named.

Processing after reaching a leaf is the same as that of the tree type discriminator, and the fern type discriminator can also perform multi-class discrimination.

<Processing of Learning Ferns>

Figure 14:
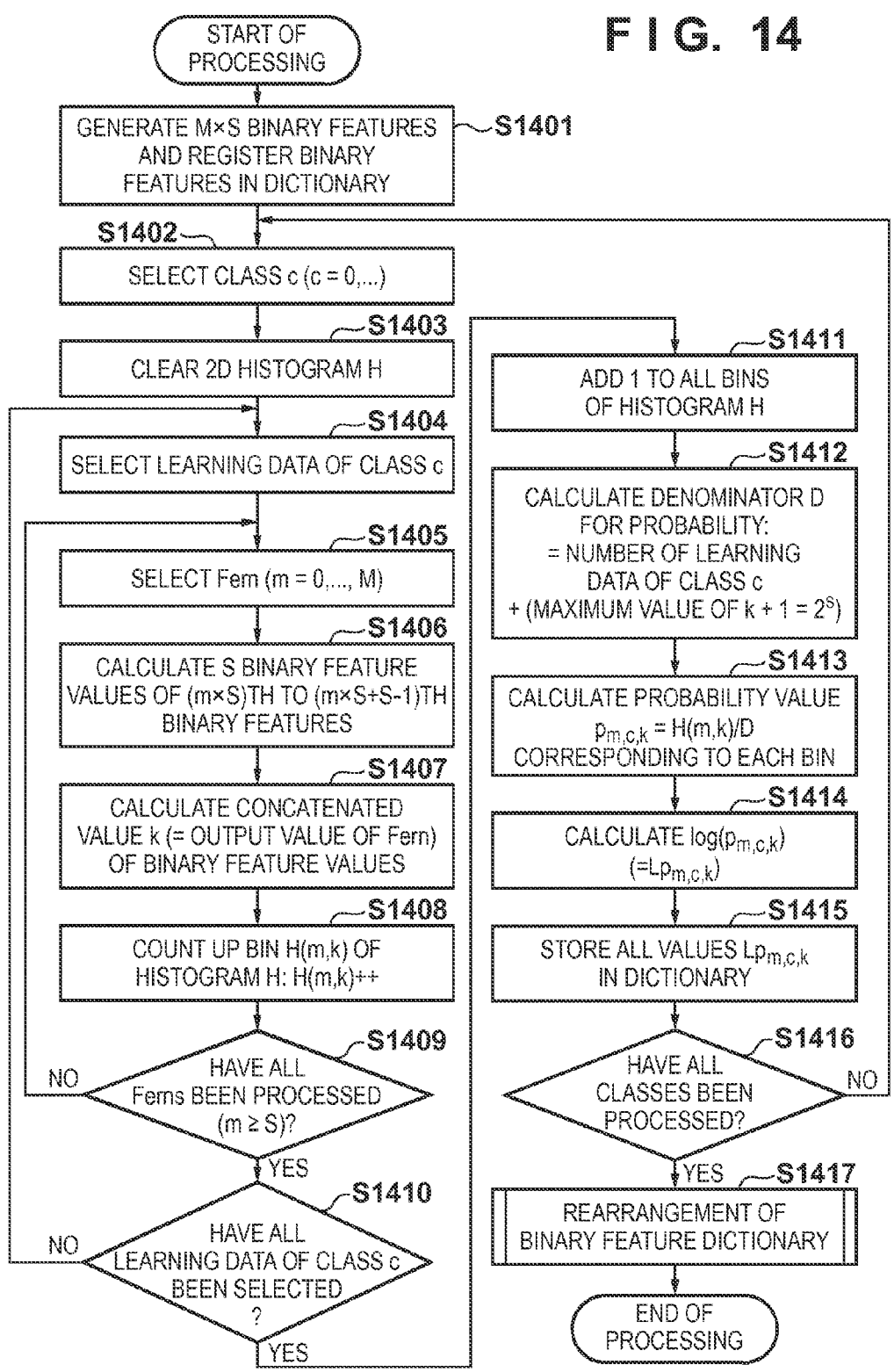
FIG. 14 is a flowchart illustrating learning processing according to the embodiment, which is applied to the fern type discriminator.

FIG. 14 shows a learning processing procedure in which the present invention is applied to generation of the discrimination processing dictionary of the fern type discriminator. Processing in steps S1401 to S1416 is basically the same as that in the technique disclosed in reference 4. Especially processing in step S1417 is unique to the present invention. This procedure will be described below.

In step S1401, M×S binary features are generated. In this embodiment, a difference feature which compares two pixels as described above is used. The positions of two pixels of each feature may be randomly selected. Note that M represents the number of ferns to be created, and S represents the number of binary features used for each fern. Information such as reference pixel positions and the like of the generated binary feature is registered in a discrimination processing dictionary.

In step S1402, a class number c of a discrimination target class is selected. The number of discrimination target classes is two or more, and the classes are sequentially numbered from 0.

In step S1403, a two-dimensional histogram H for calculating each class probability value is initialized. In the histogram H, a fern number m and a concatenation value k of the discrimination results of the S binary features are used as indices, and H(m,k) indicates one bin. Each bin H(m,k) corresponds to the kth leaf of the mth fern, which has been described with reference to FIG. 13C.

In step S1404, among a number of learning sample data items prepared for each discrimination target class, one of sample data items of the selected class c is selected.

In step S1405, the M ferns to be learned are sequentially selected from the beginning. Assume that m represents a fern number (=0, 1, ..., M).

In step S1406, the S binary feature values generated for the mth fern in step S1401 are calculated for the selected sample data. These values correspond to the (m×S)th to (m×S+S−1) th binary features.

In step S1407, the S binary feature values are sequentially concatenated to calculate a value k of S bits, which corresponds to the output value of the mth fern.

By using the calculated values k and m as indices, the bin H(m,k) of the histogram H is counted up in step S1408.

In step S1409, it is determined whether binary features used for all the ferns of the currently selected sample data have been calculated and added to obtain the histogram H. If this processing is not complete, the process returns to step S1405 to perform the above processing for the fern with the next number.

If the processing is complete for all the ferns of the currently selected sample data, it is determined in step S1410 whether the processing is complete for all the sample data of the currently selected class c. If the processing is not complete, the process returns to step S1404, and the next sample data is selected and processed.

If the processing is complete for all the sample data of the class c, 1 is added to all the bins of the histogram H in step S1411. This corresponds to accumulation when the probabilities of each class obtained by a plurality of ferns are summed, and avoids a situation in which if at least one discrimination result indicating a probability of 0 is included, the summation result is 0, resulting in a decrease in discrimination performance. That is, even if a class is discriminated as a class with a low probability, the class does not have a probability of 0.

In step S1412, a denominator D for probability calculation is calculated by adding the Sth power of 2 to the number of learning sample data items of the class c. The Sth power of 2 indicates the number of possible values of the number k of S bits, and corresponds to the number of leaves for each fern, that is, the number of bins for the mth fern of the histogram H. The calculated value D equals the total value of bins of the histogram H for each fern, and the same value D can be used for all the ferns.

$$D = (\text{number of sample data items of class } c) + 2^s \quad (8)$$

In step S1413, a probability value $P_{m,c,k}$ for each bin is calculated, as given by:

$$P_{m,c,k} = H(m,k)/D \quad (9)$$

The probability value $P_{m,c,k}$ corresponds to a probability parameter indicating the probability that the data belongs to the class c held in the kth leaf of the mth fern.

In step S1414, the probability value $P_{m,c,k}$ is converted into a logarithm. This is done to enable the use of addition instead of multiplication when obtaining the sum of probabilities of each class discriminated by a plurality of ferns in discrimination. The converted value is represented by $L_{P_{m,c,k}}$.

In step S1415, the calculated values $L_{P_{m,c,k}}$ are stored as parameters of the kth leaf of the mth fern of the discrimination processing dictionary.

In step S1416, it is determined whether learning for all the classes is complete. If learning for all the classes is not complete, the process returns to step S1402 to execute learning for the next class c.

If learning for all the classes is complete, processing of rearranging the M×S binary features generated in step S1401 is performed in step S1417. As described above, the S binary features $f_i$ of each fern may be calculated in any order as long as the order of finally concatenating bits is maintained. In this embodiment, a feature for which the reference positions of two pixels are randomly selected is used, as described above. Therefore, the reference load of the memory can be reduced by rearranging the calculation orders to increase a cache hit rate, thereby increasing the speed. Note that the cache architecture of the target system according to the embodiment uses the 2-way set associative scheme which relatively improves the access efficiency using a feature obtained by referring to two points. The present invention is not limited to this, as a matter of course.

FIGS. 16A to 16C show an example of the rearrangement processing. FIG. 16A shows the parameters of the binary features generated in step S1401. For each binary feature, in addition to the reference point coordinates (x0, y0) and (x1, y1) of two points, the fern number m and binary feature number are set as parameters in consideration of rearrangement in step S1417.

FIG. 16B shows the binary features obtained as the result of rearrangement. In order to reduce the reference load, the binary features are rearranged so that a cache hit readily occurs when referring to the two points (x0, y0) and (x1, y1), as compared with FIG. 16A. As a result, the order of the fern numbers or binary feature numbers s is irregular.

Figure 15:
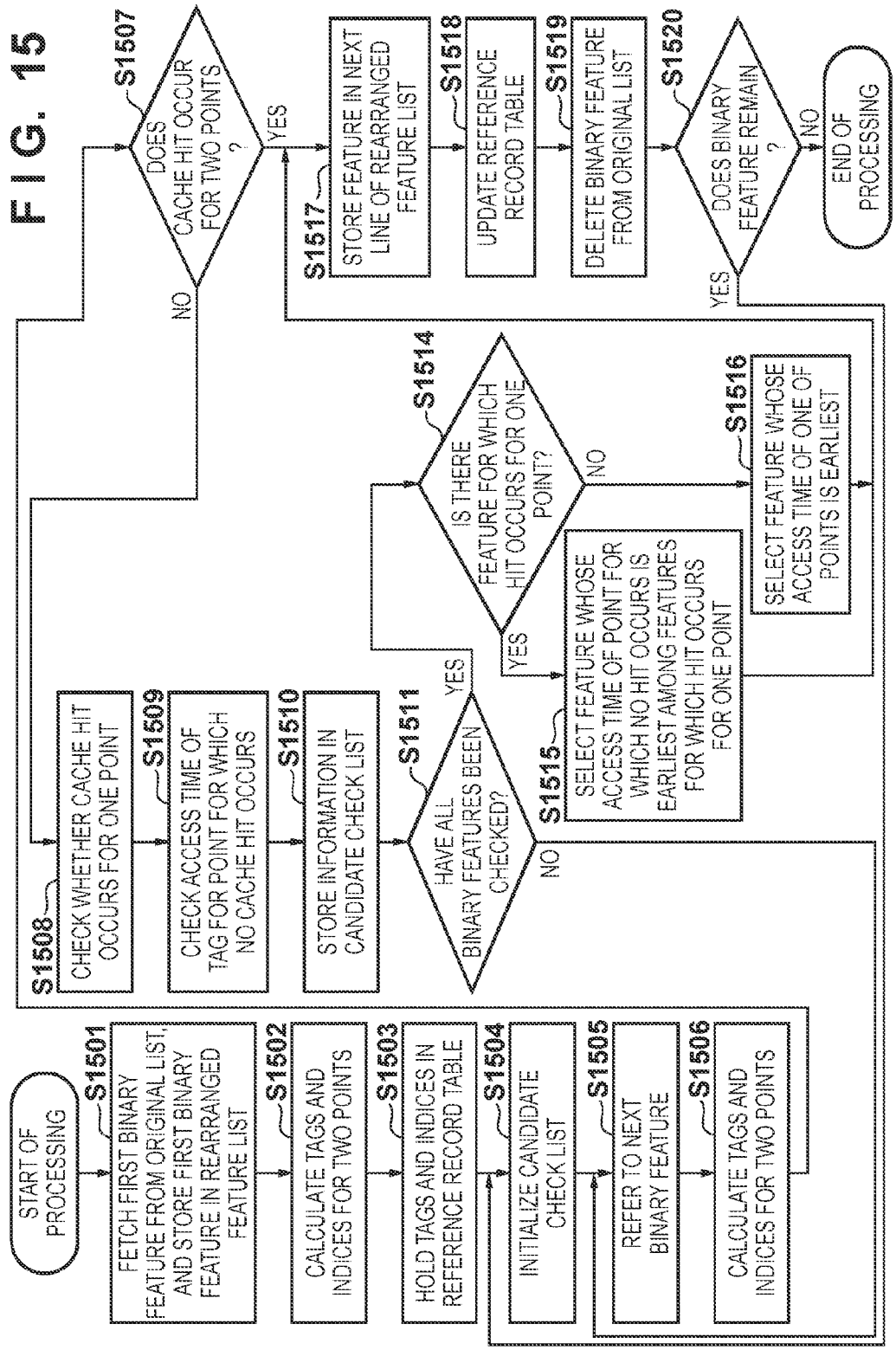
FIG. 15 is a flowchart illustrating processing of rearranging binary features according to the embodiment, which is applied to the fern type discriminator.

FIG. 15 shows the detailed procedure of the rearrangement processing in step S1417 to reduce the reference load. Note that calculation of the reference load in this embodiment corresponds to cache hit determination for the two points of each binary feature. As the number of points for which a cache hit is determined is larger, the reference load is lower. In this example, a rearranged feature list (corresponding to FIG. 16B) is generated by rearranging the original list (corresponding to FIG. 16A) of the M×S binary features generated in step S1401 of FIG. 14 in a calculation order in discrimination processing. This procedure will be described below.

In step S1501, the first binary feature of the original list is fetched. This feature corresponds to the first feature of the list shown in FIG. 16A. This binary feature is stored at the beginning of the rearranged feature list corresponding to FIG. 16B. At the time of calculating the first binary feature, an access record to discrimination target data in the main memory is undefined (for example, there is no access record when another bus master transfers data by DMA or the like), and thus a cache hit is not influenced regardless of a selected binary feature.

In step S1502, using the positions of two points to be referred to by the first binary feature and the first address of a discrimination target image storage area, the tag and index of each of the two points are calculated. This processing is the same as that in steps S701 and S702 of FIG. 7 described above.

In the step S1503, the calculated tags and indices of the two points are stored in the reference record table. In this embodiment, the cache architecture of the target system uses the 2-way set associative scheme, as described above. Therefore, the reference record table holds information corresponding to the tag array of the cache. In addition, the reference record table holds, for each cache line of the data array, an access time when the cache line is accessed. This information corresponds to the time stamp of each tag of the tag array as described in the third embodiment, and is used to discriminate data which has been referred to at the earliest time. The information need not be a time in the learning processing system. For example, a value (for example, 0) based on which the earliest time is determined may be stored in the initial state (that is, an undefined state in which no line is stored in the cache), and a value which is updated (incremented by one, for example) every time access occurs may be stored.

In step S1504, a candidate check list of feature candidates to be selected next is initialized. The candidate check list is used to hold, for each feature index, a cache hit state when calculating a corresponding feature next, by sequentially assigning feature indices 0 to M×S−1 to the binary features of the original list from the first binary feature. FIG. 16C shows an example of the table, which stores a flag indicating whether a cache hit occurs for one of two reference points, and the access time of a cache line already stored in the line for the other point for which a cache hit does not occur. Referring to FIG. 16C, "access time 0" and "access time 1" indicate areas which store access times if a cache hit occurs for neither of the two points (x0, y0) and (x1, y1) of a feature candidate. If the two-way set associative scheme is used, the reference record table holds two access times for each line, and an earlier one of the access times is selected and stored in the candidate check list. For a point for which a cache hit occurs, a special value (for example, −1 or the like) indicating that a hit has occurred is stored.

In step S1505, the parameters of the next binary feature of the original list are referred to. In step S1506, the tags and indices of the two reference points of the binary feature are calculated, similarly to step S1502.

In step S1507, by referring to the reference record table, it is determined whether a cache hit occurs for both the two points.

If a cache hit occurs for both the two points, the reference load is lowest, it is thus confirmed that the binary feature is to be calculated next, and the binary feature is stored in the next line of the rearranged feature list in step S1517. Note that in the embodiment, if a cache hit occurs for both the two points, the corresponding feature is confirmed as a feature which is assigned with top priority to be calculated next, and thus it is not necessary to use the above-described candidate check list. The candidate check list is not configured to store information indicating that a cache hit occurs for the two points.

If it is determined that a cache hit occurs for neither of the two points, it is checked in step S1508 whether a cache hit occurs for one point.

In step S1509, for a point for which a cache hit does not occur, the access time of a line to be replaced on the cache is checked based on the information of the reference record table.

The check result is stored in the candidate check list together with the feature index in step S1510. Note that for a point for which a cache hit occurs, a value (for example, the latest access time) based on which a hit can be discriminated is stored in the area of the access time.

In step S1511, it is determined whether all the binary features of the original list have been checked. If not all the binary features have been checked, the process returns to step S1505 to check the next candidate.

If all the binary features of the original list have been checked, the candidate check list is checked in step S1514. Since it has been confirmed at this time that there is no feature for which a cache hit occurs for two points and which has the lowest reference load, it is checked whether there is a feature for which a cache hit occurs for one point and which has the second lowest reference load.

If there are one or more features for which a hit occurs for one point, the process advances to step S1515 to select, among the features, a feature whose access time of a cache line corresponding to the other point for which a hit does not occur is earliest.

Assume that there is no feature for which a hit occurs for one point. In this case, since the candidate check list stores only features for which a cache hit occurs for neither of two points, an earlier one of the access times of cache lines corresponding to the two points of each feature is obtained, the obtained access times are compared with each other, and then a feature having the earliest access time is selected.

That is, in this embodiment, if a cache hit does not occur for at least one of two points, a cache line having an earliest access time is preferentially replaced, which does not always minimize the reference load. To perform further optimization, it is only necessary to decrease the replacement priority level of a line which will be accessed in the future at a high probability in processing including predictive processing but the processing is complicated and a description thereof will be omitted.

In step S1517, the selected binary feature is stored in the next line of the rearranged feature list. In step S1518, the reference record table is updated. The tag and index of a reference point, for which a cache hit does not occur, of the binary feature confirmed in this processing are calculated to update the information corresponding to the tag array. Regardless of whether a hit occurs, the access times of cache lines corresponding to the two reference points are updated. In step S1519, the selected binary feature is removed from the original list. Note that if the already selected feature is managed by a selected flag not to be selected any more, it is not necessary to actually delete the information of the feature from the original list. In step S1520, it is checked whether a binary feature which has not been selected yet remains in the original list. If a binary feature remains, the process returns to step S1504 to select the next feature.

Continuing the above-described processing until there is no binary feature in the original list completes the rearranged feature list which enables a cache hit to readily occur and has an access order that replaces a cache line having an earliest access time when no cache hit occurs. By registering the list as a discrimination processing dictionary on the target system, it is possible to realize high-speed discrimination processing having an improved cache hit rate and low reference load while obtaining the same discrimination accuracy as that obtained when binary feature calculation is performed in the order of the original list.

<Processing of Discriminating Ferns>

Figure 17:
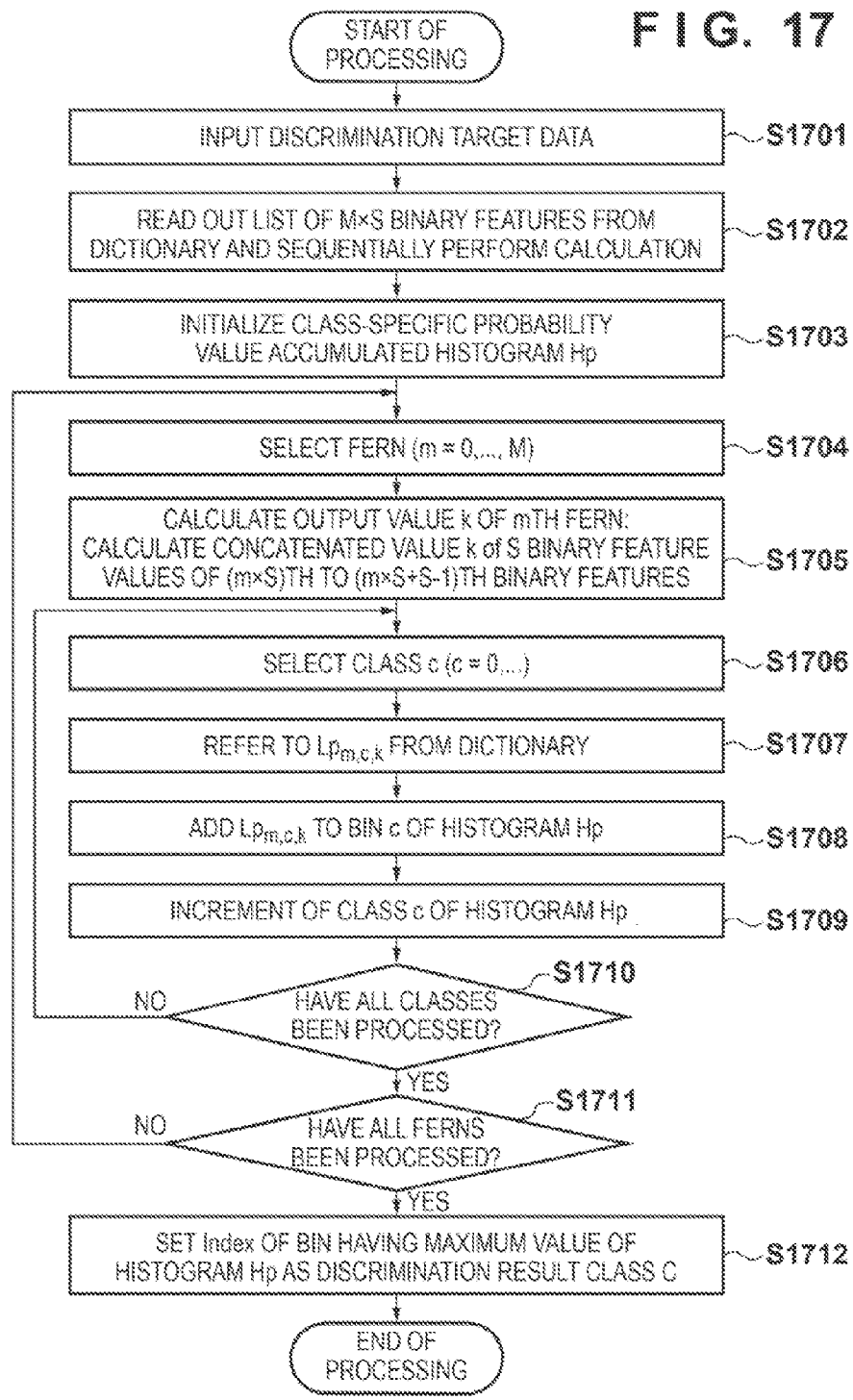
FIG. 17 is a flowchart illustrating an example of discrimination processing by the fern type discriminator.

FIG. 17 shows a discrimination processing procedure executed on the target system using the generated discrimination processing dictionary.

In step S1701, discrimination target data is input. As in the embodiment, necessary preprocessing has been performed in advance.

In step S1702, the binary feature list which has been generated in the preceding learning processing and rearranged in the access order is read out from the discrimination processing dictionary, and calculation is performed by sequentially referring to pixels. As described above, the list has been generated to improve the cache hit rate, thereby allowing high-speed processing. The calculated M×S binary features are held as, for example, a two-dimensional data array so as to reproduce the original order before rearrangement.

In step S1703, a class-specific probability value accumulated histogram Hp is initialized. This histogram is used to obtain the sum of probability values each indicating the probability that the discrimination target data belongs to a corresponding class. The number of bins coincides with the number of classes to be discriminated. All the bins are cleared to 0.

In step S1704, a fern number m is selected from 0.

In step S1705, the output value (=concatenated value of the binary feature values) of the mth fern is calculated. In this example, a concatenated value k of S bits is calculated by referring to the (m×S)th to (m×S+S−1)th binary feature values for the mth fern among the binary feature values calculated in step S1702. Note that (m×S) to (m×S+S−1) correspond to index numbers in the original list described in the aforementioned learning processing.

In step S1706, a class c is selected from a class having a number of 0. A logarithmic probability value $L_{P_{m,c,k}}$ which is registered in the discrimination processing dictionary and indicates the probability that the discrimination target data belongs to the class c when the mth fern has the concatenated value k is referred to in step S1707, and is added to the bin of class c of the histogram Hp in step S1708.

In step S1710, it is checked whether the logarithmic probability value has been added for all the discrimination target classes c. If the value has not been added for all the classes, the process returns to step S1706 to select the next class c.

In step S1711, it is checked whether class-specific probability summation processing has been performed for all the ferns. If the processing has not been performed for all the ferns, the process returns to step S1704 to perform the processing for the next fern number m. Finally, in step S1712, a bin having a maximum value of the accumulated histogram Hp is selected, and a corresponding index is confirmed as a discrimination result class C.

As described above, according to this embodiment, since the binary feature list rearranged to improve the cache hit rate is used for calculation of binary features of the fern type discriminator, it is possible to realize high-speed processing with the same accuracy as that obtained when the list is not rearranged. The present invention is applicable by "tuning" the generated discrimination dictionary after learning. Note that the idea of calculating the reference load based on the number of points for which a cache hit occurs according to this embodiment is also applicable to a binary feature obtained by referring to a plurality of points (for example, a total value within a rectangle based on reference of four points in an integral image), as a matter of course.

In all the aforementioned embodiments, a discrimination processing dictionary is arranged not to influence an operation of caching discrimination target data, for the sake of descriptive convenience. For example, the discrimination processing dictionary is arranged in a non-cache area of the main memory, an area assigned to another cache, or another storage area such as a ROM. The present invention, however, is applicable to even a case in which the discrimination processing dictionary is arranged in an area which influences an operation of caching discrimination target data. In this case, cache hit determination need only be performed by simulation including dictionary access.

The preferred embodiments of the present invention have been described in detail. However, the present invention is not limited to the above-described specific embodiments, and various changes and modifications can be made within the spirit and scope of the present invention as defined by the appended claims.

For example, the present invention is applicable not only to the discrimination processing of the type described in the above embodiments but also to information processing including various processes according to a predetermined information processing rule, as a matter of course. That is, the information processing rule is not limited to the discrimination dictionary used in the discrimination processing, and includes various rules which define the memory access order. The present invention is applicable by considering the reference load when selecting a feature amount, setting a calculation order which reduces the reference load after all features are obtained, or partially combining these processes, as described in the above embodiments.

As a reference load calculation method, instead of using a cache hit determination result as described in the above embodiments, another method can be used. For example, the total number of system clocks required by the target system to access desired element data and obtain a calculation result may be calculated by simulation.

Moreover, the present invention is applicable to a case in which the target system has another cache architecture such as a full associative cache or has various line sizes, as a matter of course. The present invention is also applicable even if a rule for storing discrimination target data in a memory is different from the aforementioned raster scan or Z-ordering scheme. Data to undergo information processing is not limited to image data, and the present invention is equally applicable to various target data such as audio data or feature amount data array.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-259059, filed Nov. 27, 2012, which is hereby incorporated by reference herein in its entirety.

What is claimed is:

1. An information processing apparatus which generates an information processing rule for executing information processing for target data in a target system including a processor and a memory, comprising:
one or more processors configured to function as:
an input unit configured to input configuration information concerning configuration elements of the target system;
a calculator configured to calculate, in accordance with the input configuration information, a reference load for referring to an element at each position in the target data in the memory when the processor executes the information processing, in consideration of a cache hit based on histories of the positions of the elements of the processing target data which have been referred to so far; and
a determination unit configured to determine the information processing rule representing the positions of the elements to be referred to and a reference order thereof using the reference load calculated by said calculator.

2. The apparatus according to claim 1, wherein the target data is image data or a feature amount data array.

3. The apparatus according to claim 1, wherein the information processing is class discrimination processing of discriminating whether the target data belongs to a specific class.

4. The apparatus according to claim 1, wherein said determination unit successively selects the positions of the elements to be referred to so as to reduce the reference load, and an order of the selection is determined as the reference order.

5. The apparatus according to claim 1, wherein said determination unit determines the reference order so as to reduce the reference load after selecting the positions of all the elements necessary for executing the information processing.

6. An electronic device, executing information processing for target data by referring to an information processing rule generated by an information processing apparatus according to claim 1.

7. An information processing apparatus which generates an information processing rule for executing information processing for target data in a target system including a processor and a memory, comprising:
one or more processors configured to function as:
an input unit configured to input configuration information concerning configuration elements of the target system;
a calculator configured to calculate, in accordance with the input configuration information, a reference load for referring to an element at each position in the target data in the memory when the processor executes the information processing, in consideration of a cache architecture for improving efficiency when the processor refers to data in the memory, and a storage rule for storing each element of the target data at a predetermined position in the memory; and
a determination unit configured to determine the information processing rule representing the positions of the elements to be referred to and a reference order thereof using the reference load calculated by said calculator.

8. The apparatus according to claim 7, wherein the storage rule is a raster scan scheme, and said calculator calculates the reference load by assuming a low load for the element at an adjacent position in the horizontal direction within a range of a corresponding cache line with respect to the referred element of the target data.

9. The apparatus according to claim 7, wherein the storage rule is a Z-ordering scheme, and said calculator calculates the reference load by assuming a low load for the element at an adjacent position within a range of a corresponding cache line in an arrangement according to the Z-ordering scheme with respect to the referred element of the target data.

10. The apparatus according to claim 7, wherein the cache architecture uses a direct mapping scheme, and the history of the position of the element of the processing target data includes information corresponding to one or more preceding reference positions for each cache line.

11. The apparatus according to claim 7, wherein
the cache architecture uses a set associative cache scheme, and
the history of the position of the element of the processing target data includes information corresponding to preceding reference positions the number of which is equal to the number of ways of the set associative cache scheme.

12. A control method for an information processing apparatus which generates an information processing rule for executing information processing for target data in a target system including a processor and a memory, the method comprising:
an input step of inputting configuration information concerning configuration elements of the target system;
a calculation step of calculating, in accordance with the input configuration information, a reference load for referring to an element at each position in the target data in the memory when the processor executes the information processing, in consideration of a cache hit based on histories of the positions of the elements of the processing target data which have been referred to so far; and
a determination step of determining the information processing rule representing the positions of the elements to be referred to and a reference order thereof using the reference load calculated in the calculation step.

13. A non-transitory computer-readable storage medium storing a program for, when loaded to a computer and executed by the computer, causing the computer to execute each step of a method according to claim 12.

14. A control method for an information processing apparatus which generates an information processing rule for executing information processing for target data in a target system including a processor and a memory, the method comprising:
an input step of inputting configuration information concerning configuration elements of the target system;
a calculation step of calculating, in accordance with the input configuration information, a reference load for referring to an element at each position in the target data in the memory when the processor executes the information processing, in consideration of a cache architecture for improving efficiency when the processor refers to data in the memory, and a storage rule for storing each element of the target data at a predetermined position in the memory; and
a determination step of determining the information processing rule representing the positions of the elements to be referred to and a reference order thereof using the reference load calculated in said calculation step.

15. A non-transitory computer-readable storage medium storing a program for, when loaded to a computer and executed by the computer, causing the computer to execute each step of a method according to claim 14.

* * * * *